United States Patent
Sidhu et al.

(10) Patent No.: US 9,924,513 B2
(45) Date of Patent: Mar. 20, 2018

(54) BAND-SWITCHING OPERATIONS IN A MESH NETWORK ENVIRONMENT

(71) Applicant: Belkin International, Inc., Playa Vista, CA (US)

(72) Inventors: Gursharan Sidhu, Moorpark, CA (US); Ryan Yong Kim, Rolling Hills Estates, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 18 days.

(21) Appl. No.: 14/339,191

(22) Filed: Jul. 23, 2014

(65) Prior Publication Data

US 2016/0029384 A1    Jan. 28, 2016

(51) Int. Cl.
*H04W 72/04*    (2009.01)
*H04W 84/12*    (2009.01)
(Continued)

(52) U.S. Cl.
CPC ........ *H04W 72/0453* (2013.01); *H04W 8/186* (2013.01); *H04W 84/12* (2013.01); *H04W 84/18* (2013.01)

(58) Field of Classification Search
None
See application file for complete search history.

(56) References Cited

U.S. PATENT DOCUMENTS

2004/0160907 A1*   8/2004   Perlman ................ H04W 88/08
                                                                            370/319
2006/0056352 A1   3/2006   Proctor et al.
(Continued)

FOREIGN PATENT DOCUMENTS

EP    2 530 850 A2    12/2012
EP    2 530 851 A2    12/2012
(Continued)

OTHER PUBLICATIONS

International Search Report and Written Opinion issued in International Application No. PCT/US2015/033534 dated Aug. 25, 2015, 13 pages.
(Continued)

*Primary Examiner* — Brandon Renner
*Assistant Examiner* — Jay Vogel
(74) *Attorney, Agent, or Firm* — Kilpatrick Townsend & Stockton LLP

(57) ABSTRACT

Techniques and systems for selectively performing band-switching operations are provided. For example, a method, computing device, or computer-program product may be provided, and may include receiving a communication from a first device, wherein the communication is received on a channel of a first WiFi frequency band, wherein the communication is received using a first WiFi circuit of the computing device, and wherein the computing device is a node of a mesh network. The method, computing device, or computer-program product may further include determining whether the first device is a node of the mesh network, determining a second device to which to transmit the communication, and determining whether the second device is a node of the mesh network. The method, computing device, or computer-program product may further include determining whether to transmit the communication to the second device on a second WiFi frequency band, wherein the second WiFi frequency band is different from the first WiFi frequency band, and wherein determining whether to transmit the communication on the second WiFi frequency band depends on whether the first device is a node of the mesh network.

18 Claims, 18 Drawing Sheets

(51) Int. Cl.
*H04W 84/18* (2009.01)
*H04W 8/18* (2009.01)

(56) References Cited

U.S. PATENT DOCUMENTS

| | | | |
|---|---|---|---|
| 2007/0280155 A1* | 12/2007 | Le | C07D 301/06 370/328 |
| 2008/0291846 A1* | 11/2008 | Lu | H04W 40/246 370/254 |
| 2009/0264093 A1* | 10/2009 | Rothschild | G08B 25/001 455/404.2 |
| 2010/0115272 A1* | 5/2010 | Batta | H04L 45/00 713/162 |
| 2013/0198305 A1* | 8/2013 | Veillette | H04L 51/00 709/206 |
| 2014/0169221 A1* | 6/2014 | Cha | H04L 41/0806 370/255 |
| 2015/0130552 A1 | 5/2015 | Bhagat et al. | |
| 2015/0271829 A1 | 9/2015 | Amini et al. | |
| 2015/0351096 A1 | 12/2015 | Sidhu et al. | |

FOREIGN PATENT DOCUMENTS

| | | |
|---|---|---|
| WO | 2004/047308 A2 | 6/2004 |
| WO | 2015/187556 A1 | 12/2015 |
| WO | 2016/014557 A1 | 1/2016 |

OTHER PUBLICATIONS

International Search Report and Written Opinion issued in International Application No. PCT/US2015/041368 dated Feb. 25, 2015, 11 pages.

"IEEE Standard for Information 1-27 technology—Telecommunications and information exchange between systems Local and metropolitan area networks-Specific requirements Part 11: Wireless LAN Medium Access Control (MAC) and Physical Layer (PHY) Specifications; IEEE Std 802.11-2012 (Revision of IEEE Std 802.1" IEEE STD 802.11-2012. IEEE Computer Society. New York. USA. Mar. 29, 2012 (Mar. 29, 2012). pp. 1-2793. XP068050195. ISBN: 978-0-7381-7211-8.

Van Zhang et al., "Wireless Mesh Networking": Wireless Mesh Networking, Jan. 2007 (Jan. 1, 2007) Auerbach Publications XP055187521 ISBN: 978-0-84-937399-2.

Edimax: "EW-7238RPD N300+ Concurrent Dual-Band Universal Wi-Fi Extender," Jan. 3, 2013, pp. 1-4, Retrieved from the Internet: URL:http://www.edimax.com/images/Image/datasheet/Wireless/EW-7238RPD/EW-7238RPD_Datasjeet_v1.1_2013Jan03.pdf [retrieved on Aug. 4, 2015].

Non-Final Office Action dated Feb. 12, 2016 for U.S. Appl. No. 14/294,109; 9 pages.

* cited by examiner

700

```
┌─────────────────────────────────────────┐
│ RECEIVE A COMMUNICATION FROM A FIRST DEVICE, │
│ WHEREIN THE COMMUNICATION IS RECEIVED ON A   │
│ CHANNEL OF A FIRST WIFI FREQUENCY BAND, WHEREIN │
│ THE COMMUNICATION IS RECEIVED USING A FIRST WIFI │
│ CIRCUIT OF THE COMPUTING DEVICE, AND WHEREIN THE │
│ COMPUTING DEVICE IS A NODE OF A MESH NETWORK │
│ 702 │
└─────────────────────────────────────────┘
                    │
                    ▼
┌─────────────────────────────────────────┐
│ DETERMINE WHETHER THE FIRST DEVICE IS A NODE OF │
│ THE MESH NETWORK │
│ 704 │
└─────────────────────────────────────────┘
                    │
                    ▼
┌─────────────────────────────────────────┐
│ DETERMINE A SECOND DEVICE TO WHICH TO TRANSMIT │
│ THE COMMUNICATION │
│ 706 │
└─────────────────────────────────────────┘
                    │
                    ▼
┌─────────────────────────────────────────┐
│ DETERMINE WHETHER THE SECOND DEVICE IS A NODE │
│ OF THE MESH NETWORK │
│ 708 │
└─────────────────────────────────────────┘
                    │
                    ▼
┌─────────────────────────────────────────┐
│ DETERMINE WHETHER TO TRANSMIT THE │
│ COMMUNICATION TO THE SECOND DEVICE ON A SECOND │
│ WIFI FREQUENCY BAND, WHEREIN THE SECOND WIFI │
│ FREQUENCY BAND IS DIFFERENT FROM THE FIRST WIFI │
│ FREQUENCY BAND, AND WHEREIN DETERMINING │
│ WHETHER TO TRANSMIT THE COMMUNICATION ON THE │
│ SECOND WIFI FREQUENCY BAND DEPENDS ON WHETHER │
│ THE FIRST DEVICE IS A NODE OF THE MESH NETWORK │
│ 710 │
└─────────────────────────────────────────┘
```

FIG. 7

BAND-SWITCHING OPERATIONS IN A MESH NETWORK ENVIRONMENT

FIELD

The present disclosure relates to optimizing network performance. Specifically, various techniques and systems are provided for selecting frequency bands using band-switching operations to optimize network performance in mesh network environments.

BACKGROUND

Multiple gateways may be present within a local area network. For example, a local area network may include a router and one or more range extending devices. Network devices that provide various functionalities may also be present within the local area network. For example, a network device may provide a user with the ability to remotely configure or control one or more electronic devices within and around an environment or venue using an access device.

A gateway allows client devices (e.g., network devices, access devices, or the like) to access a network by providing wired connections and/or wireless connections using radio frequency channels in one or more frequency bands. The quality of communication that client device can achieve with other devices on the network may be adversely affected by various factors. For example, throughput, latency, and other network characteristics may be affected by interfering signals, contention-free periods, or the like.

BRIEF SUMMARY

Techniques are described for using one or more band-switching operations to optimize network performance. In some examples, a computing device may be a node of a mesh network that includes multiple devices, with each device acting as a node of the mesh network. The computing device may receive a communication on a frequency band, and may determine whether to transmit the communication on a different frequency band or on the same frequency band. The determination may depend on various factors. For example, the computing device may transmit the communication on the same frequency band in the event it determines that a device it received the communication from is a node of a mesh network. In another example, the computing device may transmit the communication on a different frequency band in the event it determines that the device it received the communication from is not a node of the mesh network. Other factors may be considered by the computing device in determining whether to transmit the communication to the receiving device on a different frequency band or on the same frequency band. For example, other factors may include time, speed, noise, number of nodes of the mesh network, a combination thereof, or any other appropriate factors. Once the computing device determines that a different frequency band will be used to transmit the communication, it may, upon receiving the communication on a first frequency band, determine and/or select a second frequency band on which to transmit the communication.

In some examples, the computing device may be a first gateway that provides network access to one or more access devices, network devices, or the like. For example, the first gateway may be a wireless range extending device, a router, an access point, or the like. The first gateway may be connected to one or more other gateways (e.g., a wireless range extending device, a router, an access point, or the like), with the first gateway and one or more other gateways making up a mesh network. In some embodiments, a gateway may include a single transceiver radio circuit for each frequency band. In some embodiments, a gateway device may include multiple transceiver radio circuits for each frequency band. In some embodiments, the mesh network may be made up of three or more gateways, including the first gateway, a second gateway, and a third gateway. One or more of the gateways may be connected to a wide area network (e.g., the Internet, a cloud network, and/or the like). In some embodiments, the gateways may be connected in a daisy chain arrangement so that each gateway is connected to two devices (e.g., another gateway, a client device, an access device, or the like). In some embodiments, all of the gateways may be connected to one another. Any other appropriate mesh network topologies may also be used.

The gateways may be setup to be connected to other gateways in the mesh network using two or more frequency bands. For example, the first gateway may receive a communication from a client device (e.g., an access device, a network device, or the like) on a channel of a first frequency band. The first gateway may determine that the client device is not a node of the mesh network, and, in response, may determine a second frequency band on which to transmit the communication to the second gateway. The first gateway may then transmit the communication to the second gateway on a channel of the second frequency band. The second gateway may determine that the first gateway is a node of the mesh network and that the third gateway is a node of the mesh network. The second gateway may then transmit the communication to the third gateway on the channel of the second frequency band. The third gateway may determine that the second gateway is a node of the mesh network, and that a receiving device that it will send the communication to is not a node of the mesh network. In response to determining that the receiving device is not a node of the mesh network, the third gateway may determine the band that the receiving device is using to connect to the mesh network. The third gateway may determine whether a different band other than the second frequency band is needed to transmit the communication to the receiving device. For example, the third gateway may transmit the communication to the receiving device on the band that the receiving device is using to connect to the mesh network, such as the first frequency band, the second frequency band, or a third frequency band. Accordingly, in some embodiments, the frequency band on which a communication is communicated may be switched when the communication is received into the mesh network and/or when the communication is transmitted from the mesh network.

According to at least one example, a computing device may be provided that includes one or more data processors, and a first WiFi circuit for receiving a communication from a first device, wherein the communication is received on a channel of a first WiFi frequency band, and wherein the computing device is a node of a mesh network. The computing device may further include a non-transitory machine-readable storage medium containing instructions which when executed on the one or more data processors, cause the one or more processors to perform operations including determining whether the first device is a node of the mesh network, determining a second device to which to transmit the communication, determining whether the second device is a node of the mesh network, and determining whether to transmit the communication to the second device on a second WiFi frequency band, wherein the second WiFi frequency band is different from the first WiFi frequency band, and wherein determining whether to transmit the communication on the second WiFi frequency band depends on whether the first device is a node of the mesh network.

In some embodiments, a computer-implemented method may be provided that includes receiving, on a computing device, a communication from a first device, wherein the communication is received on a channel of a first WiFi frequency band, wherein the communication is received using a first WiFi circuit of the computing device, and wherein the computing device is a node of a mesh network. The method may further include determining whether the first device is a node of the mesh network, determining a second device to which to transmit the communication, and determining whether the second device is a node of the mesh network. The method may further include determining whether to transmit the communication to the second device on a second WiFi frequency band, wherein the second WiFi frequency band is different from the first WiFi frequency band, and wherein determining whether to transmit the communication on the second WiFi frequency band depends on whether the first device is a node of the mesh network.

In some embodiments, a computer-program product tangibly embodied in a non-transitory machine-readable storage medium of a first network device may be provided. The computer-program product may include instructions configured to cause one or more data processors to: receive a communication from a first device, wherein the communication is received on a channel of a first WiFi frequency band, wherein the communication is received using a first WiFi circuit of the computing device, and wherein the computing device is a node of a mesh network; determine whether the first device is a node of the mesh network; determine a second device to which to transmit the communication; determine whether the second device is a node of the mesh network; and determine whether to transmit the communication to the second device on a second WiFi frequency band, wherein the second WiFi frequency band is different from the first WiFi frequency band, and wherein determining whether to transmit the communication on the second WiFi frequency band depends on whether the first device is a node of the mesh network.

In some embodiments, the method, computing device, and computer-program product described above may further include wherein the first WiFi circuit is configured to transmit the communication to the second device on the first WiFi frequency band when it is determined that the first device is a node of the mesh network. In some embodiments, the first device includes a wireless range extending device.

In some embodiments, the method, computing device, and computer-program product described above may further include transmitting the communication to the second device on the second WiFi frequency band when it is determined that the first device is not a node of the mesh network, wherein the communication is transmitted on a channel of the second WiFi frequency band, and wherein the communication is transmitted using a second WiFi circuit of the computing device. In some embodiments, the first device includes a network device, an access device, or a server of a wide area network. In some embodiments, when the first WiFi frequency band includes a 2.4 gigahertz frequency band, the second WiFi frequency band includes a 5 gigahertz frequency band. In some embodiments, when the first WiFi frequency band includes a 5 gigahertz frequency band, the second WiFi frequency band includes a 2.4 gigahertz frequency band.

In some embodiments, the method, computing device, and computer-program product described above may further include wherein the computing device includes a wireless range extending device.

In some embodiments, the method, computing device, and computer-program product described above may further include transmitting the communication to the second device on the second WiFi frequency band when it is determined that the first device is a node of the mesh network, when it is determined that the second device is not a node of the mesh network, and when the second device is connected to the mesh network using the second WiFi frequency band, wherein the communication is transmitted on a channel of the second WiFi frequency band, and wherein the communication is transmitted using a second WiFi circuit of the computing device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 is a flowchart illustrating an embodiment of a process for determining whether to switch frequency bands, in accordance with some embodiments.

DETAILED DESCRIPTION

Figure 1:
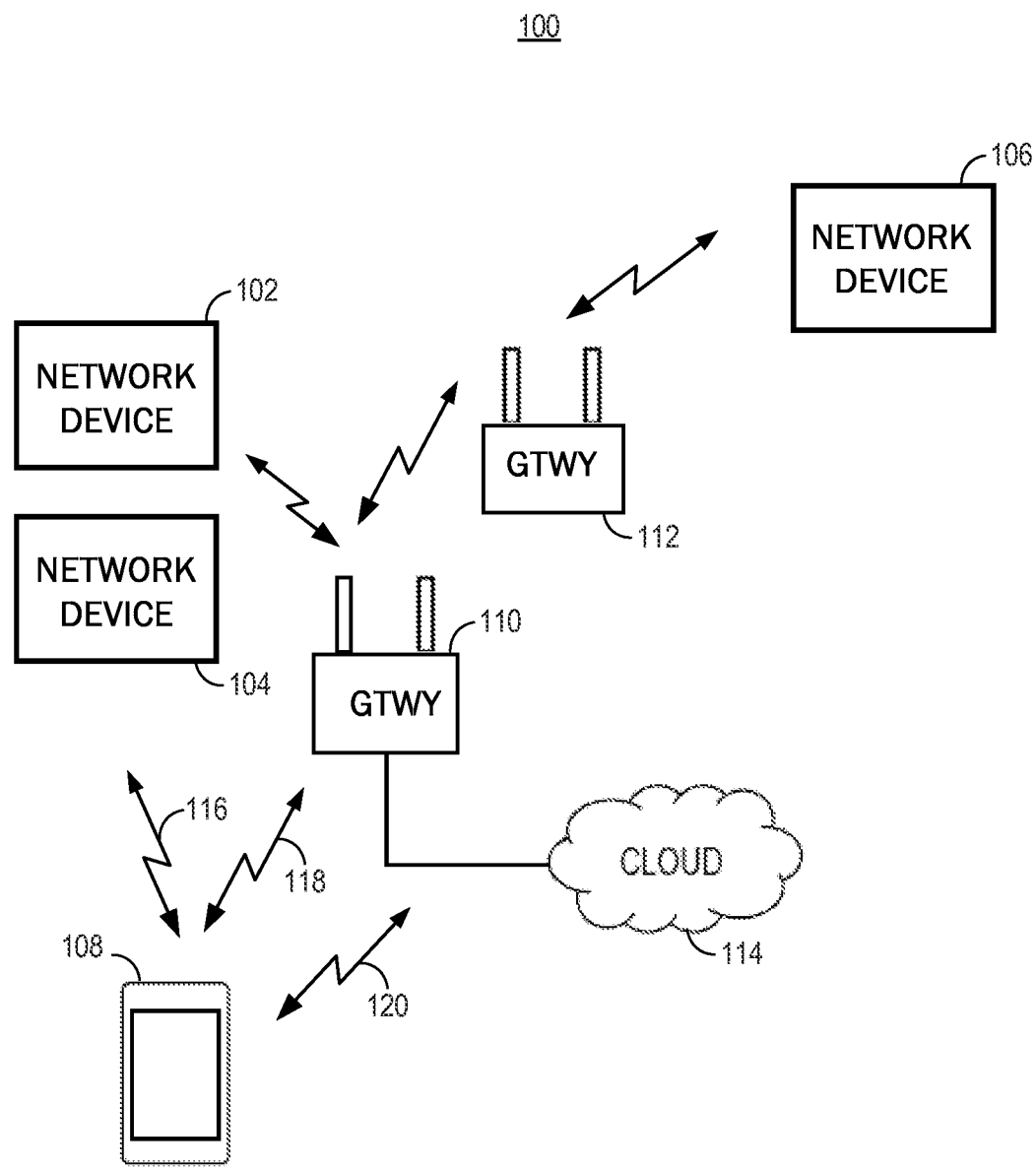
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment or a venue that can support the network. An environment or a venue can include, for example, a home, an office, a business, an automobile, a park, an industrial or commercial plant, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network of a venue can include multiple network devices that provide various functionalities. Network devices may be accessed and controlled using an access device and/or one or more network gateways. One or more gateways in the local area network may be designated as a primary gateway that provides the local area network with access to an external network. In the event the venue includes a structure or building, the local area network can extend outside of the venue, and may include network devices located outside of the venue. For instance, the local area network can include network devices such as exterior motion sensors, exterior lighting (e.g., porch lights, walkway lights, security lights, or the like), garage door openers, sprinkler systems, or other network devices that are exterior to the venue. A user may be able to access the network devices while located within the local area network and also while located remotely from the local area network. For example, a user may access the network devices using an access device within the local area network or remotely from the local area network.

FIG. 1 illustrates an example of a local area network 100. It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

As illustrated in FIG. 1, the local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include automation network devices that allow a user to access, control, and/or configure various appliances, devices, or tools located within an environment or venue (e.g., a television, radio, light, fan, humidifier, sensor, microwave, iron, a tool, a manufacturing device, a printer, a computer, and/or the like), or outside of the venue (e.g., exterior motion sensors, exterior lighting, garage door openers, sprinkler systems, or the like). For example, network device 102 may include a home automation switch that may be coupled with a home appliance. In some embodiments, network devices such as an automation network device may be used in other environments or venues, such as a business, a school, an establishment, a park, an industrial or commercial plant, or any place that can support the local area network 100 to enable communication with network devices. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an IoT device interface (e.g., an Internet enabled appliance such as a wall switch, a control interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. While two gateways 110 and 112 are shown in FIG. 1, one of ordinary skill in the art will appreciate that any number of gateways may be present within the local area network 100.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

Upon being powered on or reset, network devices may be registered with an external network (e.g., cloud network 114) and associated with a logical network within the local area network 100. Details relating to registration of network devices are described below with respect to FIG. 9.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™, Zigbee™, Bluetooth™, infrared (IR), cellular, Long-Term Evolution (LTE), WiMax™, or other wireless communication technologies, or any combination thereof. For example, the WiFi™ protocol is described in the IEEE 802.11 family of standards. Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

Figure 2:
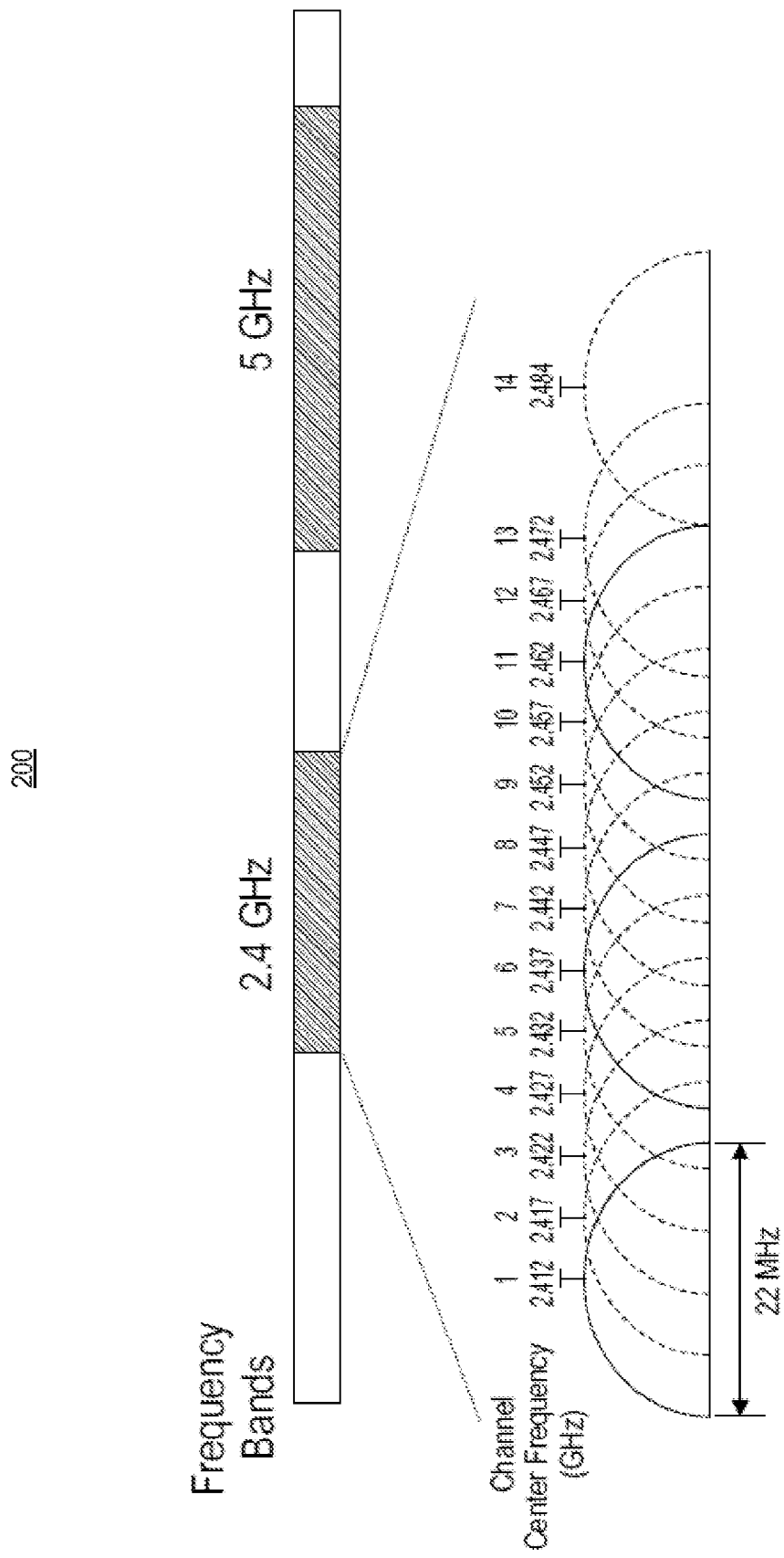
FIG. 2 is an illustration of an example of channels of a frequency band, in accordance with some embodiments.
Figure 3:
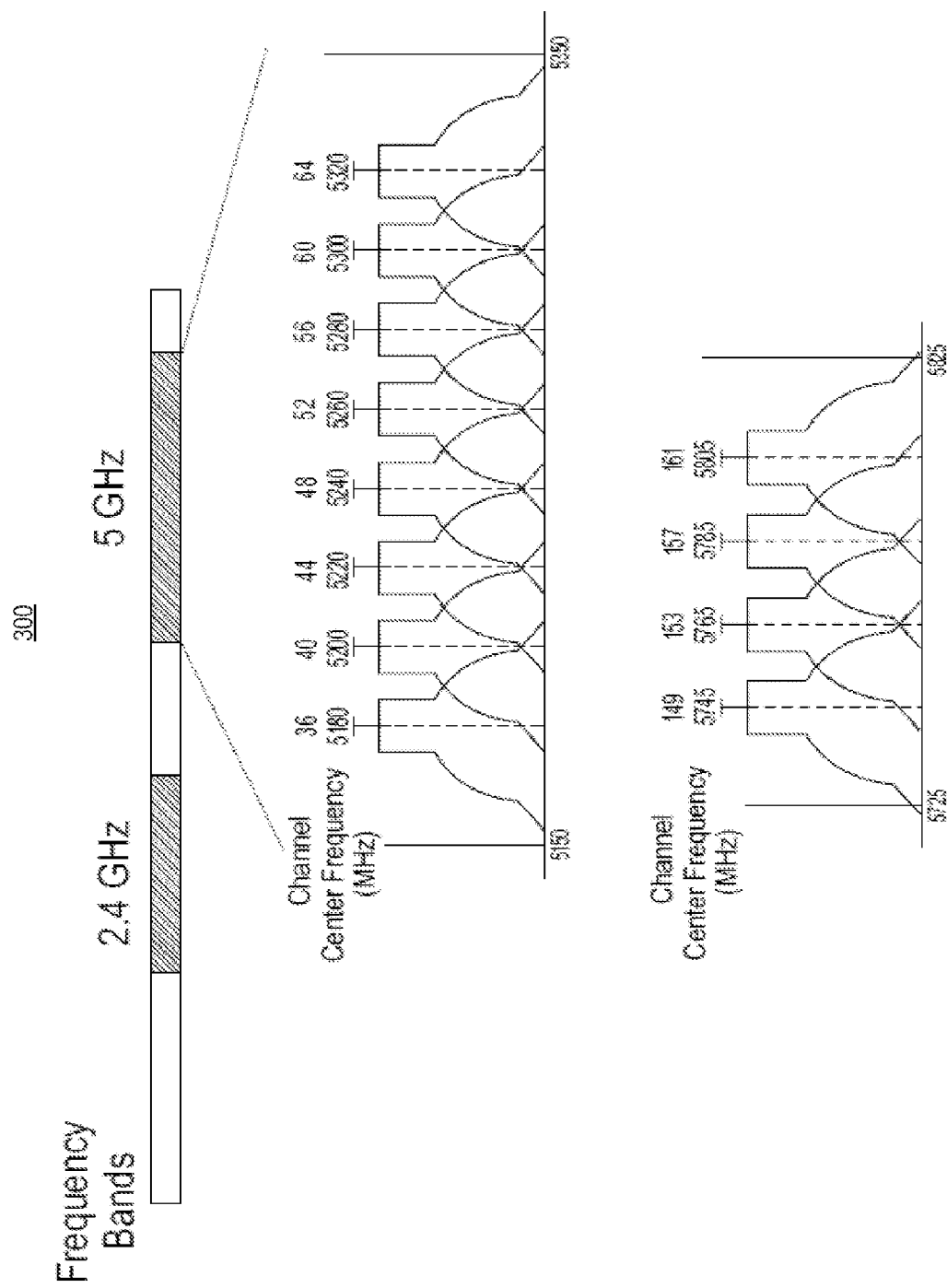
FIG. 3 is an illustration of another example of channels of a frequency band, in accordance with some embodiments.

The network devices 102, 104, 106 and access device 108 can transmit and receive signals using one or more channels of various frequency bands provided by the gateways 110 and/or 112. FIGS. 2 and 3 illustrate examples of channels of different WiFi™ frequency bands available for use in communicating signals in a network.

FIG. 2 illustrates an example of fourteen channels available on a 2.4 gigahertz (GHz) WiFi™ frequency band that spans from 2.412 GHz to 2.484 GHz. Each channel is 22 MHz wide. The channel center of each channel is separated from an adjacent channel center by 5 MHz, with the exception of the spacing between the channel centers of channels 13 and 14, which is 12 MHz. Some or all of the channels may be available for use in a network. For example, channels 1-11 may be available for use in a local area network. As another example, channels 1-13 may be available for use in a local area network. As yet another example, channels 1-14 may be available for use in a local area network. One of ordinary skill in the art will appreciate that any combination of the channels available on the 2.4 GHz frequency band may be available for use in a network. The channels that are available for use may be regulated by the country in which the network is located. Of the fourteen channels of the 2.4 GHz frequency band, three are non-overlapping (non-interfering), including channels 1, 6, and 11.

FIG. 3 illustrates an example of twelve channels available on a 5 GHz WiFi frequency band that spans from 5.180 GHz to 5.805 GHz. The channel center of each channel in the 5 GHz band is separated from an adjacent channel center by 20 MHz. Other 5 GHz channels may also be provided, such as channels 7-9, 11, 12, 16, 34, 38, 42, 46, 100, 104, 108, 112, 116, 120, 124, 128, 131, 136, 140, 165, 183-185, 187-189, 192, and 196. Some or all of the channels may be available for use in a network. For example, channels 36, 40, 44, 48, 52, 56, 60, 64, 149, 153, 157, and 161 may be available for use in a local area network. As another example, channels 36, 40, 44, 48, 52, 56, 60, and 64 may be available for use in a local area network. One of ordinary skill in the art will appreciate that any combination of the channels available on the 5 GHz frequency band may be available for use in a network. The channels that are available for use may be regulated by the country in which the network is located.

While FIGS. 2 and 3 illustrate specific examples of frequency bands, one of ordinary skill in the art will appreciate that any available frequency band, including those that are currently in use or that may become available at a future date, may be used to transmit and receive communications according to embodiments described herein. For example, other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), or the like. Yet other examples of frequency bands that may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz).

In some embodiments, a gateway or a client device (e.g., a network device, an access device, or the like) communicating with the gateway may select a particular frequency band to use for the communication. Once a band is selected, the gateway or the client device may select one or more channels on which to send and receive communications between the gateway and the client devices. The number of channels that can be used at a given point in time depends on the number of transceiver radio circuits that the gateway includes. For example, if the gateway includes a single transceiver radio circuit for a first frequency band of a particular wireless technology (e.g., a 2.4 GHz WiFi transceiver radio circuit), the gateway can communicate using a single channel from the that frequency band at any given point in time. In some embodiments, a user may configure the gateway to transmit and receive on a particular channel of a particular frequency band that is selected by the gateway or client device. In some embodiments, the gateway may automatically select a channel based on the quality of the channel. For example, a user may configure the gateway to select, or the gateway may automatically select, channel 1 of the 2.4 GHz band if another gateway in the vicinity of the gateway is using channel 6, since channels 1 and 6 do not overlap. In some embodiments, the gateway may listen for data traffic on other channels, and can switch from one channel to another channel to achieve better reception.

Figure 4:
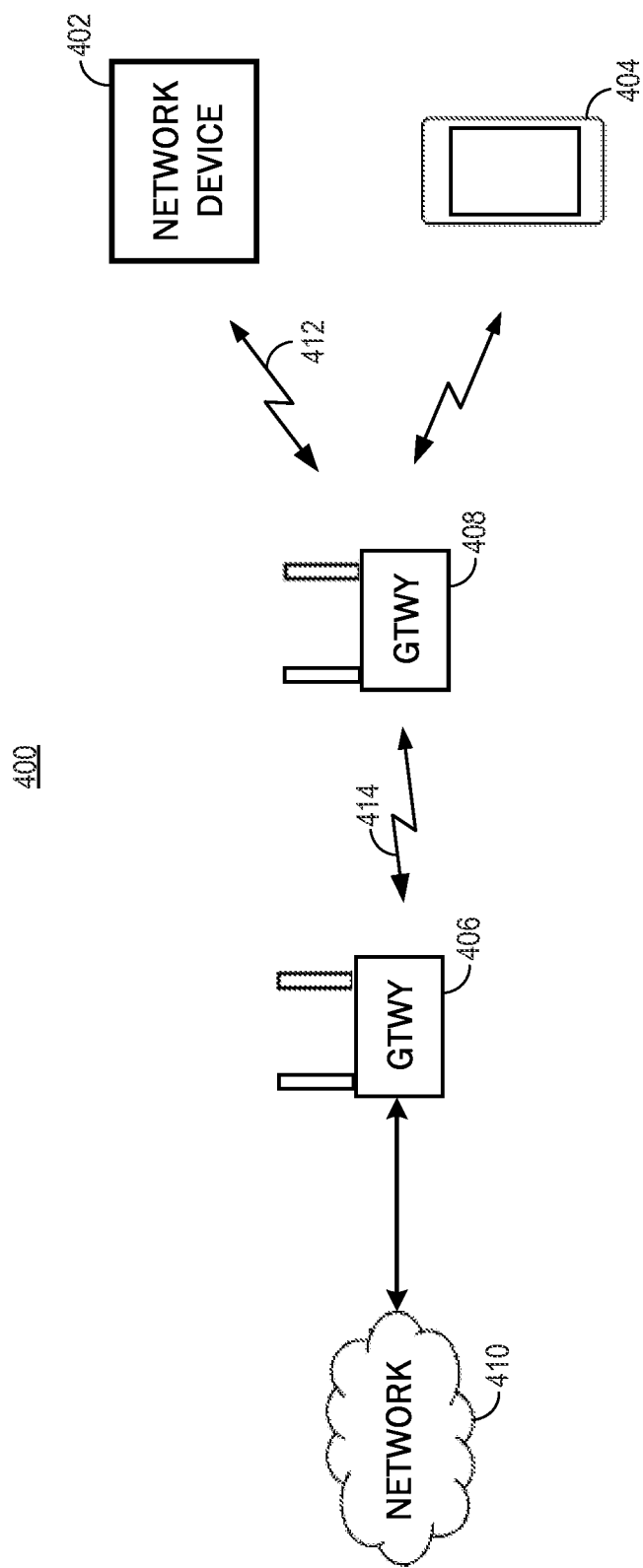
FIG. 4 is an illustration of an example of a network environment, in accordance with some embodiments.
Figure 5:
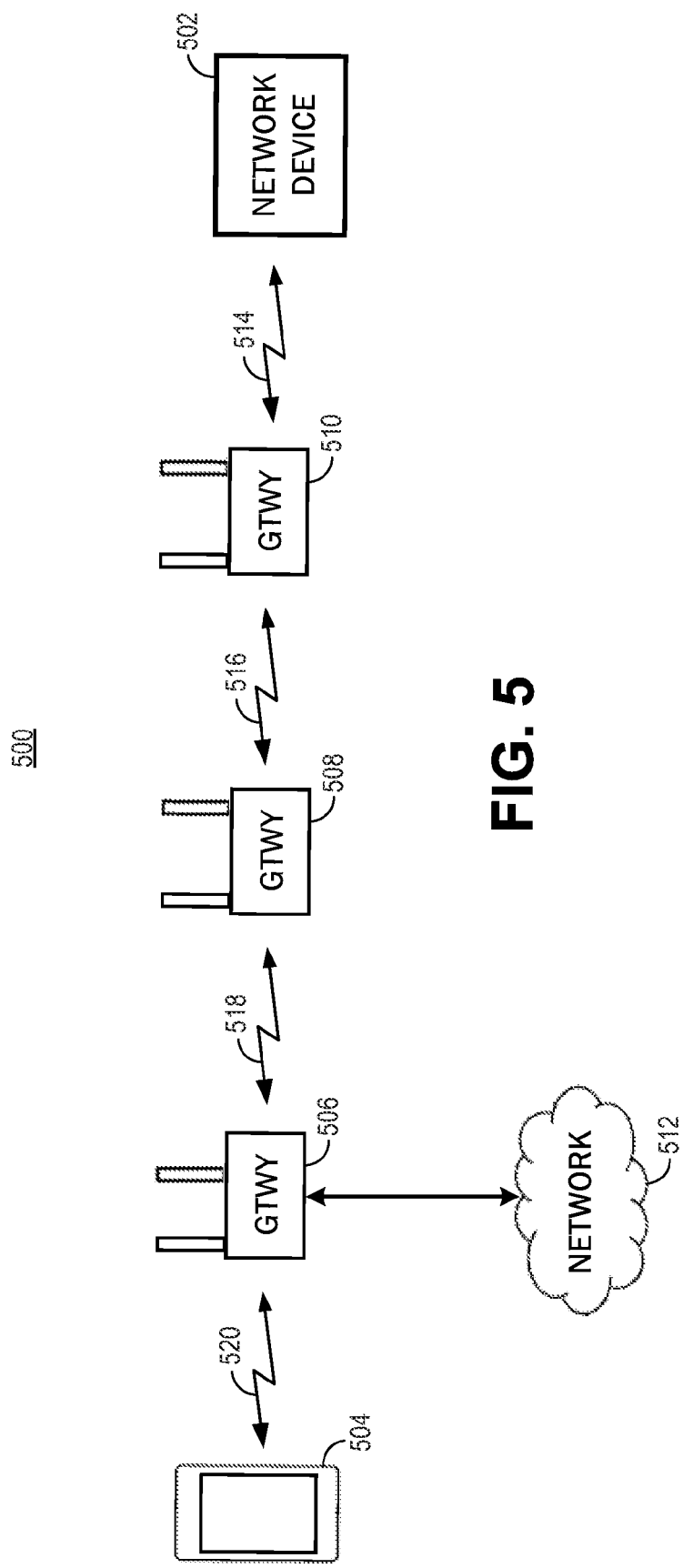
FIG. 5 is an illustration of another example of a network environment, in accordance with some embodiments.
Figure 6:
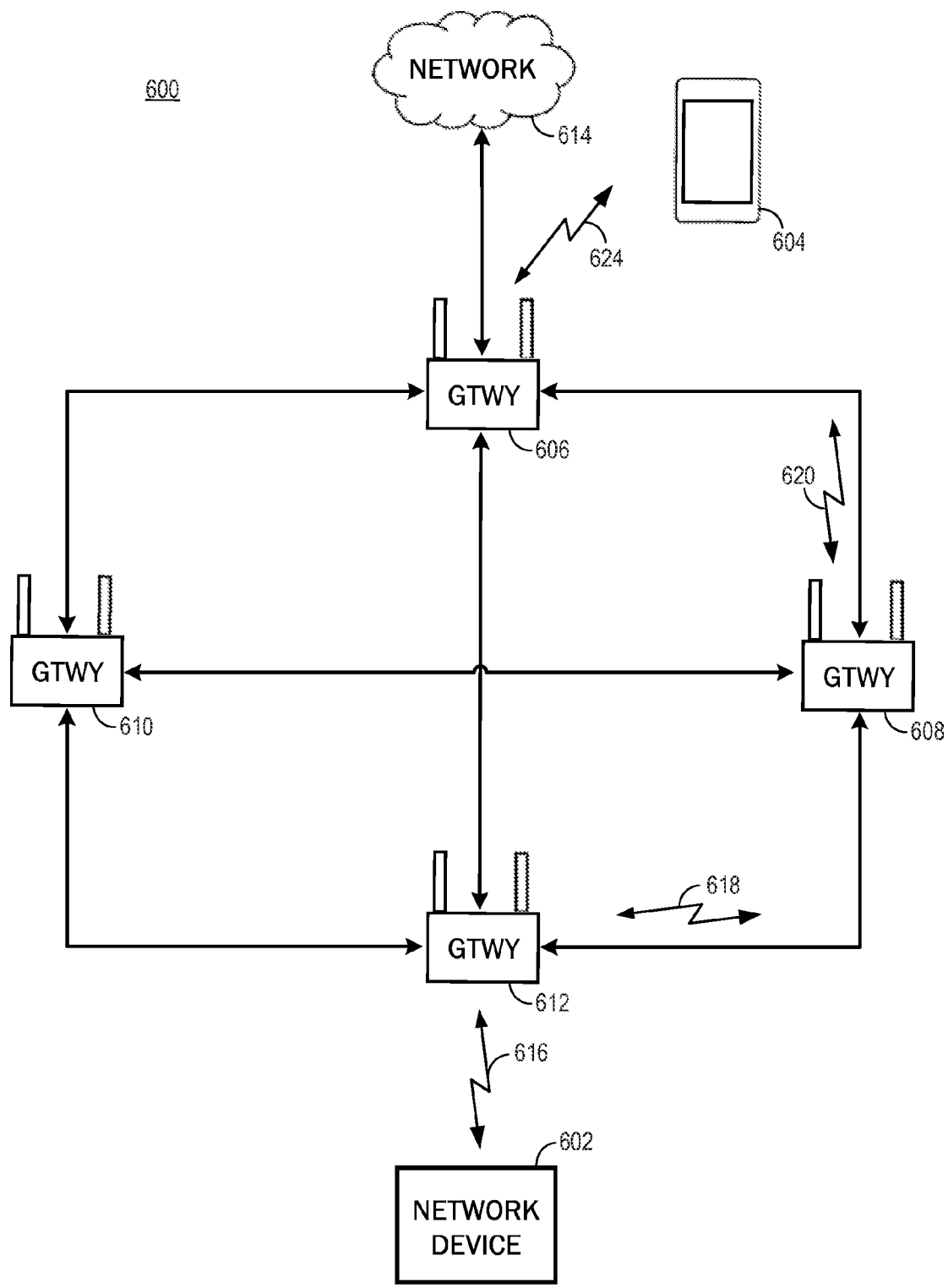
FIG. 6 is an illustration of another example of a network environment, in accordance with some embodiments.

It is desirable to provide a user with optimal network conditions when communicating on a network. However, conditions may deteriorate as multiple devices connect to the network, as large amounts of data are communicated on the network, or the like. Accordingly, techniques and systems are provided that use one or more band-switching operations to optimize network performance in various types of networks. FIGS. 4-6 illustrate examples of systems in which one or more gateways can perform band-switching operations.

FIG. 4 illustrates an example of a local area network 400 including a gateway 408 that can perform band-switching operations. Similar to the local area network 100 described above, the local area network 400 includes a network device 402, an access device 404, gateways 406, 408, and a network 410. It should be appreciated that the local area network 400 may have other components than those depicted. Further, the embodiment shown in the figure is only one example of a local area network that may incorporate an embodiment of the invention. In some other embodiments, local area network 400 may have more or fewer components than shown in the figure, may combine two or more components, or may have a different configuration or arrangement of components.

In some embodiments, the network device 402 may include a network device that allows a user to access, control, and/or configure various objects located within the user's home, such as those described above with respect to FIG. 1. For example, network device 402 may include a home automation switch that may be coupled with a home appliance. One of ordinary skill in the art will appreciate that the network device 402 may include any other type of device that can be remotely controlled by a user.

Access device 404 may be utilized by a user to wirelessly communicate with the network device 402. The access device 404 may include any human-to-machine interface with network connection capability that allows access to a network, such as a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an internet of things (IoT) device interface (e.g., an Internet enabled appliance such as a wall switch, a control interface, or the like). The user may interact with the network device 402 using an application, a web browser, a proprietary program, or any other program executed and operated by the access device 404. In some embodiments, the access device 404 may communicate directly with the network device 402. In some embodiments, the access device 404 may communicate with the network device 402 via the gateways 406, 408 and/or the network 410.

While only a single network device 402 and a single access device 404 are shown in FIG. 4, one of ordinary skill in the art will appreciate that multiple network devices and multiple access devices may be connected with the network 400.

Gateway 406 and 408 may provide communication capabilities to network device 402 and access device 404 via radio signals in order to provide communication, location, and/or other services to the devices. While two gateways 406 and 408 are shown in FIG. 4, one of ordinary skill in the art will appreciate that any number of gateways may be present within the local area network 400. The wireless network provided by gateway 406 and gateway 408 may be any type of network familiar to those skilled in the art that can support data communications using any of a variety of commercially-available protocols. For example, gateways 406, 408 may provide wireless communication capabilities for the wireless local area network 400 using particular communications protocols, such as WiFi™ (e.g., IEEE 802.11 family standards), or other mobile communication technologies, or any combination thereof. Using the communications protocol(s), the gateways 406, 408 may provide radio frequencies on which wireless enabled devices in the local area network 400 can communicate.

The gateways 406 and 408 may also provide the access device 404 and the network device 402 with access to one or more external networks, such as the network 410, which may include a cloud network, the Internet, and/or other wide area networks. The network 410 may be similar to the cloud network 114 described with respect to FIG. 1. Gateway 406 is connected to the network 410 (via a wired or wireless connection), and provides the devices on the local area network 400 with access to the network 410.

The gateways 406, 408 may include a router, an access point, a modem, a range extending device, and/or any other device that provides wireless network access among one or more computing devices and/or external networks. For example, gateway 406 may include a router or access point providing the network 400 with access to the external network 410, and gateway 408 may include a range extending device.

The router gateway 406 may include access point and router functionality, and may further include an Ethernet switch and/or a modem. For example, the router gateway 406 may receive and forward data packets among different networks. When a data packet is received, the router gateway 406 may read identification information (e.g., a media access control (MAC) address) in the packet to determine the intended destination for the packet. The router gateway 406 may then access information in a routing table or routing policy, and may direct the packet to the next network or device in the transmission path of the packet. The data packet may be forwarded from one gateway to another through the computer networks until the packet is received at the intended destination.

The range extending gateway 408 may be used to improve signal range and strength within the network 400. For example, the range extending gateway 408 may take an existing signal from the router gateway 406 (or access point) and may rebroadcast the signal to create a second logical network. For example, the range extending gateway 408 may extend the network coverage of the router gateway 406 when two or more devices on the network 400 need to be connected with one another, but the distance is too far for a direct connection to be established. As a result, devices outside of the coverage area of the router gateway 406 may be able to connect through the repeated network provided by the range extending gateway 408. The gateways 406 and 408 may exchange information about destination addresses using a dynamic routing protocol.

In some cases, a gateway may be configured to operate on more than one frequency band. In some embodiments, the gateway may enable band-switching operations upon determining that multiple bands are available for communicating. In some examples, gateway 406 and gateway 408 may operate on multiple bands, including any number of bands across any number of multiple wireless or other transport technologies. For example, gateway 406 and gateway 408 may operate on dual-bands, for example, using both the 2.4 GHz and 5 GHz WiFi bands. In other examples, the gateway 406 and gateway 408 may operate on multiple frequency bands of other transport technologies, such as Bluetooth™ or Zigbee™, including frequency bands that are currently available or that become available in the future. One of ordinary skill in the art will appreciate that any other combination of frequency bands may be used in any wireless or transport technology.

In embodiments where the gateway 406 and gateway 408 operate using dual-bands including 2.4 GHz and 5 GHz bands, the range extending gateway 408 may be setup and connected to the router gateway 406 with both 5 GHz and 2.4 GHz bands enabled. For example, a user may configure the router gateway 406 to enable the use of the 5 GHz and 2.4 GHz bands. The range extending gateway 408 may enable band-switching operations upon determining that both the 5 GHz and 2.4 GHz bands are available for communicating with the router gateway 406. For example, once the range extending gateway 408 determines that multiple bands are available, the band-switching operations may be automatically enabled.

In some embodiments, upon determining that multiple bands are available between the router gateway 406 and the range extending gateway 408, the range extending gateway 408 may establish two or more bands of the multiple wireless or other transport technologies for simultaneous use, rather than establishing only one of multiple bands at a time. For example, upon determining that both the 5 GHz and 2.4 GHz bands are available for communicating with the router gateway 406, the range extending gateway 408 may establish both the 2.4 GHz and the 5 GHz connections back to the router gateway 406 simultaneously. Accordingly, when both the 2.4 GHz and 5 GHz bands are available, the range extending gateway 408 can pre-establish dual path connections to the router gateway 406 in preparation for either 2.4 GHz and/or 5 GHz client devices to connect and be able to immediately take advantage of the band-switching backbone connection capability.

The router gateway 406 and the range extending gateway 408 may include one or more circuits for each frequency band of a particular technology (e.g., one or more WiFi circuits, Zigbee circuits, Bluetooth circuits, or the like). A WiFi circuit, for example, may include a WiFi transceiver radio and other related circuitry for transmitting and receiving signals on channels of the corresponding frequency band. In some embodiments, the router gateway 406 and/or the range extending gateway 408 may include two or more circuits for each frequency band of a particular technology (e.g., two or more WiFi circuits, Zigbee circuits, Bluetooth circuits, or the like), which may allow the router gateway 406 and/or the range extending gateway 408 to simultaneously transmit and receive communications on the same channel, or simultaneously transmit or receive over different channels of the frequency band. Including multiple circuits for each frequency band of a technology in the router gateway 406 and/or the range extending gateway 408 may increase the cost of the devices to a point that may be unaffordable for an average consumer. For example, including two or more WiFi circuits may unreasonably increase the cost of a range extending gateway.

In some embodiments, in order to provide the router gateway 406 and/or the range extending gateway 408 at a price that is affordable for an average consumer, each of the router gateway 406 and/or the range extending gateway 408 may include a single circuit for each available frequency band of a particular technology. For example, each of the router gateway 406 and/or the range extending gateway 408 may include a single WiFi circuit for the 2.4 GHz frequency band, and a single WiFi circuit for the 5 GHz frequency band. In the event the router gateway 406 and/or the range extending gateway 408 includes a single circuit for a frequency band of a particular technology (e.g., a single WiFi circuit for the 2.4 and a single WiFi circuit for the 5 GHz bands, or the like), the router gateway 406 and/or the range extending gateway 408 can only transmit or receive on a single channel of the frequency band at a time. Furthermore, at a given point in time, the router gateway 406 and/or the range extending gateway 408 can only transmit or receive using the single circuit, but not both transmit and receive at the same time using the single circuit. Accordingly, techniques are needed to provide band-switching functionality for gateways that include a single radio transceiver circuit for each available frequency band of a given wireless or other transport technology (e.g., a single WiFi circuit for each available band, a single Bluetooth circuit, a single Zigbee circuit, or the like), as well as for gateways that include multiple circuits for each frequency band of a given wireless or other transport technology (e.g., multiple WiFi circuits for a given band, multiple Bluetooth circuits, multiple Zigbee circuits, or the like).

According to the embodiment illustrated in FIG. 4, once band-switching operations are enabled on the range extending gateway 408, the range extending gateway 408 may receive a communication from network device 402 or access device 404 on one frequency band, and may perform the band-switching operations to transmit the communication to the router gateway 406 on a different frequency band. As previously described, the range extending gateway 408 may establish two or more bands of the multiple wireless or other transport technologies for simultaneous use, rather than establishing only one of multiple bands at a time. For example, when multiple bands are available between the router gateway 406 and the range extending gateway 408, the range extending gateway 408 can pre-establish multiple-path connections to the router gateway 406 in preparation for client devices configured to communicate using various frequency bands (e.g., 2.4 GHz and/or 5 GHz bands) to connect and be able to immediately take advantage of the band-switching backbone connection capability between the router gateway 406 and the range extending gateway 408.

The range extending gateway 408 performs a band-switching operation for each client device connection, such as for each network device and access device that communicates with the range extending gateway 408. The client device may determine or select the frequency band on which to send a communication to the range extending gateway 408. In some cases, the client device may be able to operate using only a particular band, and may select that band for communicating with the range extending gateway 408. In some cases, the client device may be configured to operate using multiple bands, and may select a particular frequency band by taking into account various performance factors (e.g., speed, consistency, range, signal strength, round-trip time, or the like) that are present based on where the client device is located relative to the router gateway 406 or range extending gateway 408 at a given point in time. For example, differences in performance factors exist between different frequency bands, such as between a 2.4 GHz frequency band and a 5 GHz frequency band. The 5 GHz frequency band channels, for example, have a lesser chance of picking up interference as compared to channels of the 2.4 GHz frequency band due to more non-overlapping channels existing in the 5 GHz band, and also due to many wireless devices (e.g., Bluetooth devices, cordless phones, microwave ovens, computers, or the like) using the 2.4 GHz frequency, resulting in less interfering signals being present on the 5 GHz band. Further, the higher the frequency for a given band, the shorter the range (the distance signals will cover) is for that frequency band. Accordingly, the 5 GHz frequency band has a shorter range as compared to a 2.4 GHz frequency band. In some cases, the 5 GHz frequency band, at shorter ranges, may have higher bandwidth and throughput data rates as compared to the 2.4 GHz frequency band at the shorter ranges. Taking into account these performance factors, the client device may select a particular frequency band that is most suitable for communicating in the network at a given point in time and location. Based on the selected frequency band used by a particular client device, the range extending gateway 408 can perform the band-switching operations to determine an appropriate frequency band on which to communicate with the router gateway 406 for the particular client device.

In one example, the network device 402 may be connected to the range extending gateway 408 using channel 412 of the 5 GHz WiFi frequency band. Channel 412 may be any of the channels described above with respect to FIG. 3. The network device 402 may select channel 412 of the 5 GHz WiFi frequency band (e.g., channel 36), for example, taking into account the various performance factors described above. For example, the network device 402 may be a media player, and may select the 5 GHz band due to the higher possible throughput data rates. The band-switching operation of the range extending gateway 408 may determine that the band that corresponds to the channel 412 is the 5 GHz frequency band. For example, the range extending gateway 408 may receive a communication from the network device 402 over channel 412, and may determine that the channel 412 is of the 5 GHz frequency band. The communication may be received by the range extending gateway 408 using a WiFi circuit configured to transmit and receive communications over the 5 GHz frequency band. In the event the range extending gateway 408 includes a single 5 GHz WiFi circuit, the band-switching operation of the range extending gateway 408 may determine another available WiFi frequency band on which to transmit the communication to the router gateway 406, such as the 2.4 GHz band of the dual bands that are available for communication between the router gateway 406 and the range extending gateway 408. The range extending gateway 408 may then transmit the communication to the router gateway 406 on a channel of the 2.4 GHz band. For example, the communication may be transmitted on channel 414 of the 2.4 GHz band (e.g., channel 6). The communication may be transmitted using a WiFi circuit configured to transmit and receive communications over the 2.4 GHz frequency band.

Other examples of band-switching operations may be performed by the range extending gateway 408. In one example, the access device 404 may be connected to the range extending gateway 408 using a channel of the 2.4 GHz WiFi frequency band, which can be any of the channels 1-14 described above with respect to FIG. 2. The access device 404 may select the channel of the 2.4 GHz WiFi frequency band, for example, taking into account the various performance factors described above. For example, the access device 404 may be a laptop computer, and may select the 2.4 GHz band due to the higher ranges that the 2.4 GHz signals can achieve. The band-switching operation of the range extending gateway 408 may determine that the band that corresponds to the channel is the 2.4 GHz frequency band. For example, the range extending gateway 408 may receive a communication from the access device 404 over the channel, and may determine that the channel is of the 2.4 GHz frequency band. The communication may be received using a WiFi circuit configured to transmit and receive communications over the 2.4 GHz frequency band. The band-switching operation of the range extending gateway 408 may then determine another available WiFi frequency band on which to transmit the communication to the router gateway 406, such as the 5 GHz band of the dual bands that are available for communication between the router gateway 406 and the range extending gateway 408. The range extending gateway 408 may then transmit the communication to the router gateway 406 on a channel of the 5 GHz band. The communication may be transmitted using a WiFi circuit configured to transmit and receive communications over the 5 GHz frequency band.

By using the band-switching operations described above with respect to FIG. 4, the range extending gateway 408 can simultaneously transmit and receive communications on different frequencies, even when the range extending gateway 408 includes a single WiFi circuit for each frequency band. As a result, the data throughput for each channel on the client-side (e.g., network and access devices) frequency band is maximized by allowing the use of channels on one or more other frequency bands for communicating with the router gateway 406.

The range extending gateway 408 may further implement various rules to allow the band-switching operations to function efficiently. In some cases, the range extending gateway 408 may determine that the multiple frequency bands are setup and connected between the router gateway 406 and the range extending gateway 408. Upon determining that the multiple frequency bands are available, the range extending gateway 408 may automatically enable band-switching operations without input from a user. For example, upon determining that both the 5 GHz and 2.4 GHz bands are available for communicating with the router gateway 406, the range extending gateway 408 may automatically enable the band-switching operations.

In some cases, another rule that may be implemented by the range extending gateway 408 may include keeping the band-switching operation enabled even in the event one of the multiple frequency bands is disabled or goes down so that only a single frequency band remains. In such cases, the band-switching operation may only be disabled by resetting the range extending gateway 408 to default settings, and then setting up the router gateway 406 to have only a single frequency band connection with the range extending gateway 408. Due to the single frequency band connection, the range extending gateway 408 will not enable the band-switching operation until multiple bands are enabled.

In some cases, the range extending gateway 408 may automatically disable the band-switching operation upon detecting that the frequency bands go from multiple bands to a single band. For example, in the event a band-switching operation is enabled by the range extending gateway 408 upon determining that dual bands are enabled between the range extending gateway 408 and the router gateway 406, but at a later point in time one of the frequency bands goes down or is disabled so that only a single frequency band remains, the range extending gateway 408 may automatically disable the band-switching operation.

In some embodiments, the range extending gateway 408 may automatically enable the band-switching operation if it detects that the throughput on a given channel exceeds a threshold level. For example, a threshold level of the channel being used at a given point in time may be set (e.g., 40%, 45%, 50%, 55%, 60%, 65%, 70%, 75%, or the like). The threshold level may be set taking into account the fact that the band-switching operation may only be beneficial for channels that are experiencing throughput levels above the threshold. As one illustrative example, if the throughput of a channel is less than 50%, the range extending gateway 408 may transmit and receive a communication on the channel without delay. Once the throughput exceeds 50%, for example, the band-switching operation may be implemented in order to prevent delays. Similarly, the range extending gateway 408 may automatically disable the band-switching operation if it detects that the throughput on a channel drops below the threshold level.

In some embodiments, in the event the range extending gateway 408 includes multiple WiFi circuits for each frequency band that is available, the range extending gateway 408 may perform channel-switching operations. For example, a client device (e.g., the network device 402, the access device 404, or the like) may communicate with a first 2.4 GHz WiFi circuit of the range extending gateway 408 using channel 1 of the 2.4 GHz frequency band. The range extending gateway 408 may then use a second 2.4 GHz WiFi circuit to transmit the communication to the router gateway 406 on channel 6 of the 2.4 GHz frequency band. As a result, the full bandwidth of channel 1 can be used for receiving communications from the client device, and the full bandwidth of channel 6 can be used for transmitting communications for that client device to the router gateway 406. The channel-switching operation can be performed individually for each client device so that the channel for transmitting communications of each client device from the range extending gateway 408 is selected based on the channel used by the range extending gateway 408 for receiving communications from each client device.

In some embodiments, a mesh network may be provided that offers network connectivity to various devices. A mesh network may include a group of node devices, with each node device acting as a node of the mesh network. The node devices of the mesh network may communicate with each other to provide a network connection across a large area. For example, a mesh network may provide wirelessly connectivity to a city or other geographic areas, large venues (e.g., a large home, an office building, a park, or the like), or other environment.

FIG. 5 illustrates an example of a mesh network 500. The mesh network 500 includes multiple gateways 506, 508, and 510 that can selectively perform band-switching operations, such as those described above, taking into account various factors. The gateways 506, 508, 510 are arranged in a daisy chain or serial arrangement, with each gateway 506, 508, or 510 being connected to one or two other gateway 506, 508, or 510. Each gateway 506, 508, 510 is a node of the mesh network 500. The mesh network 500 also includes a network device 502, an access device 504, and a network 512. It should be appreciated that the mesh network 500 may have other components than those depicted. Further, the embodiment shown in the figure is only one example of a mesh network that may incorporate an embodiment of the invention. In some other embodiments, mesh network 500 may have more or fewer components than shown in the figure, may combine two or more components, or may have a different configuration or arrangement of components.

In some embodiments, the network device 502 may include a network device that allows a user to access, control, and/or configure various objects or devices. The network device 502 may be similar to any of the network devices described herein (e.g., network devices 102, 104, 106, network device 402, network device 1000, or the like). One of ordinary skill in the art will appreciate that the network device 502 may include any other type of device that can be remotely controlled by a user.

Access device 504 may be utilized by a user to wirelessly communicate with the network device 502, the network 512, and/or any other device or a network. The access device 504 may be similar to any of the access devices described herein (e.g., access device 108, access device 404, access device 1400, or the like). The user may interact with the network device 502 using an application, a web browser, a proprietary program, or any other program executed and operated by the access device 504. In some embodiments, the access device 504 may communicate directly with the network device 502. In some embodiments, the access device 504 may communicate with the network device 502 via the gateways 506, 508, 510 and/or the network 512.

While only a single network device 502 and a single access device 504 are shown in FIG. 5, one of ordinary skill in the art will appreciate that multiple network devices and multiple access devices may be connected with the network 500.

The gateways 506, 508, and 510 may provide communication capabilities to network device 502 and access device 504 via radio signals in order to provide communication, location, and/or other services to the devices. While three gateways 506, 508, 510 are shown in FIG. 5, one of ordinary skill in the art will appreciate that any number of gateways may be present within the mesh network 500. The wireless network provided by gateways 506, 508, 510 may be any type of network familiar to those skilled in the art that can support data communications using any of a variety of commercially-available protocols. For example, gateways 506, 508, 510 may provide wireless communication capabilities for the wireless mesh network 500 using particular communications protocols, such as WiFi™ (e.g., IEEE 802.11 family standards, such as 802.11a, 802.11b, 802,11g, 802.11n. 802.11ac, or the like), or other communications transport technologies, or any combination thereof. Using the communications protocol(s), the gateways 506, 508, and 510 may provide radio frequencies on which wireless enabled devices in the mesh network 500 can communicate. The gateways 506, 508, 510 may communicate with each other and with the network devices and access devices using the wireless communications protocols.

The gateways 506, 508, 510 may also provide the access device 504 and the network device 502 with access to one or more external networks, such as the network 512, which may include a cloud network, the Internet, and/or other wide area networks. The network 512 may be similar to the cloud network 114 described with respect to FIG. 1. Gateway 506 is connected to the network 512 (via a wired or wireless connection), and provides the other gateways 508 and 510 with access to the network 512. Once the gateways 508 and 510 have access to the external network 512 via gateway 506, any of the gateways 506, 508, 510 may provide other devices (e.g., other gateways, network device, access devices, or the like) with access to the external network 512.

Each gateway 506, 508, 510 is a node of the mesh network 500. The gateways 506, 508, 510 may include a router, an access point, a modem, a range extending device, and/or any other device that provides wireless network access among one or more computing devices and/or external networks. For example, gateway 506 may include a router or access point providing the other nodes of the mesh network 500 with access to the external network 512, and gateways 508 and 510 may include an access point or range extending device. In some embodiments, other devices may act as nodes of the network. For example, an access device, a network device, or other client device may be set up as a node that provides other devices with access to the mesh network 500.

The gateways 506, 508, 510 may include one or more circuits for each frequency band of a particular technology (e.g., one or more WiFi circuits, Zigbee circuits, Bluetooth circuits, or the like). Each circuit may include a transceiver radio and other related circuitry for transmitting and receiving signals on channels of the corresponding frequency band. For example, similar to the gateways 406, 408 described above with respect to FIG. 4, gateways 506, 508, 510 may include two or more circuits for each frequency band of a particular technology or may include a single circuit for each available frequency band of a particular technology. Including a single circuit in a gateway for each frequency band may allow the gateway to be manufactured at a price that is affordable for an average consumer. As one example, each of the router gateway 506 and/or the gateways 508, 510 may include a single WiFi circuit for the 2.4 GHz frequency band and a single WiFi circuit for the 5 GHz frequency band.

The router gateway 506 may include access point and router functionality, and may further include an Ethernet switch and/or a modem. For example, the router gateway 506 may receive and forward data packets among different networks and devices. When a data packet is received, the router gateway 506 may read identification information (e.g., a media access control (MAC) address, an Internet Protocol (IP) address, or the like) in the packet to determine the intended destination for the packet. The router gateway 506 may then access information in a routing table or routing policy, and may direct the packet to the next network or device in the transmission path of the packet. The data packet may be forwarded from one gateway to another through the computer networks until the packet is received at the intended destination.

The gateways 508 and 510 may include access points and/or range extending devices. The gateways 508, 510 may not be directly connected to the external network 512, and may obtain connectivity to the external network 512 from the router gateway 506. Each of the nodes in the mesh network 500 (e.g., gateways 506, 508, 510) may share the connection to the network 512 with one or more nodes closest to them. Each of the nodes of the mesh network 500 may also include a routing table. More and more nodes may be deployed in the mesh network 500, allowing further connectivity to the external network 512 to be spread across a larger area.

As previously noted, each of the nodes of the mesh network 500, including gateways 506, 508, and 510, have a routing table. The routing table includes the MAC address and IP address of each mesh node in the mesh network 500, and the MAC address and IP address of each device (e.g., network device 502, access device 504, or another device connected to the mesh network 500) connected to nodes of the mesh network 500. Each communication frame communicated among the nodes and devices of the mesh network 500 includes a MAC address of the device from which the communication frame originates (a source address) and also a MAC address of the device to which the communication frame is destined (a destination address). A node of the mesh network 500 may refer to the destination address in a received communication frame, and may search its routing table to determine if the node is connected to the device to which the destination address belongs. For example, if the node determines that the destination MAC address exists locally such that it is connected to the device to which the destination MAC address belongs, the node may send the communication packet directly to the device. As another example, if the node determines that the destination MAC address exists elsewhere such that the node is connected to the device to which the destination MAC address belongs, the node may forward the communication packet to the next node closest to the device. The routing table may indicate to the mesh node the best route in which to send the communication packet so that the node determines the appropriate next node to which to send the communication packet.

The nodes of the mesh network 500, including gateways 506, 508, 510, may be programmed with a dynamic routing protocol (e.g., using programs, software, or the like) that enables the nodes to interact within the larger mesh network 500. For example, the dynamic routing protocol includes the language a node of the mesh network 500 speaks with other nodes to communicate information about the reachability and status of networks. The dynamic routing protocol may be used to determine routes that are stored in the routing tables, and also to update the routing tables stored by the nodes of the mesh network 500, such as the gateways 506, 508, 510. In some embodiments, information is communicated across the mesh network 500 from node to node (gateway to gateway) by hopping wirelessly from one mesh node to the next. A connection between adjacent nodes or gateways is herein referred to as a hop. For example, the mesh network 500 includes two hops, with one hop between gateways 506 and 508, and a second hop between gateways 508 and 510. Each gateway 506, 508, 510 node may discover and track neighboring nodes using the dynamic routing protocol. For example, the gateways 506, 508, 510 may use the dynamic routing protocol to exchange information about networks with which they are connected, information about destination addresses seen in received communication packets, and other appropriate information. The gateways 506, 508, 510 may be configured to automatically select an appropriate or best path through the network 500 (e.g., the quickest path, most reliable path, less congested path, a combination thereof, or the like) using the dynamic routing protocol. For example, for a client device located equidistant from two gateways, the two gateways may select the gateway that provides the strongest signal to the client device. In some embodiments, the dynamic routing protocol may be used to determine a next-best path if a determined best path to a destination becomes unusable. In some embodiments, a client device (e.g., a network device, an access device, or the like) may be programmed with the dynamic routing protocol and may be able to select an appropriate or best path through the mesh network 500. As one example of a routing protocol, the gateways 506, 508, 510 may be configured to operate according to a Hybrid Wireless Mesh Protocol (HWMP) defined in IEEE 802.11s. One of ordinary skill in the art will appreciate that any other appropriate routing protocol may be used.

The gateways 506, 508, 510 may operate on multiple bands, including any number of bands across any number of multiple wireless or other transport technologies. In some examples, the gateways 506, 508, 510 may operate on dual-bands, for example, using the 2.4 GHz and 5 GHz WiFi bands. In other examples, the gateways 506, 508, 510 may operate on multiple frequency bands of other transport technologies, such as Bluetooth™ or Zigbee™, including frequency bands that are currently available or that become available in the future. One of ordinary skill in the art will appreciate that any other combination of frequency bands may be used in any wireless or transport technology. Accordingly, the gateways 506, 508, 510 may be setup and connected to each other, and to the network device 502 and access device 504, with the multiple bands enabled. For example, in embodiments where the gateways 506, 508, 510 operate using dual-bands including 2.4 GHz and 5 GHz bands, the gateways 506, 508, 510 may be connected both 5 GHz and 2.4 GHz bands enabled.

In some embodiments, the gateways 506, 508, and 510 may broadcast multiple communications networks on the same channel for each frequency band provided by the gateways 506, 508, 510. Each of the communications networks for each frequency band may be a different logical network. One of the logical networks for a channel of a frequency band may be a mesh logical network, and another of the logical networks for the channel of the frequency band may be an access logical network. The mesh logical network is used to connect the nodes to form the mesh network 500, and may be used by the nodes to communicate with and transfer data among one another. The access logical network is used by the access device 504, the network device 502, and any other device that is able to connect with nodes of the mesh network 500. The mesh logical network may be hidden from the devices outside of the mesh network (e.g., the access device 504 and the network device 502) so that the mesh logical network is invisible and inaccessible to the devices outside of the mesh network. The different communications networks may be assigned different SSIDs to differentiate the networks, thus creating the different logical networks. In one example, the gateways 506, 508, and 510 may broadcast two logical WiFi™ networks on channel 6 of the 2.4 GHz frequency band, including a mesh logical WiFi™ network and an access logical WiFi™ network. In this example, the mesh logical WiFi™ network may be assigned SSID "2GMesh," and the access logical WiFi™ network may be assigned SSID "2GAccess." In another example, the gateways 506, 508, and 510 may broadcast two logical WiFi™ networks on channel 136 of the 5 GHz frequency band. In this example, the mesh logical WiFi™ network may be assigned SSID "5GMesh," and the access logical WiFi™ network may be assigned SSID "5GAccess." In some examples, gateways 506, 508, and 510 may broadcast two logical WiFi™ networks on the same channel of each of the 2.4 GHz and 5 GHz frequency bands.

The gateways 506, 508, 510 can perform the band-switching operations described above with respect to FIG. 4. In addition, the gateways 506, 508, 510 may selectively determine whether to perform band-switching operations. For example, the gateway 506, 508, or 510 may intelligently avoid switching frequency bands at each hop of the mesh network 500. In such examples, the gateway 506, 508, or 510 may receive a communication on a frequency band from another gateway, from the network device 502, from the access device 504, or from other devices connected to the mesh network 500. The gateway 506, 508, or 510 may determine whether to transmit the communication on a different frequency band or on the same frequency band. The determination may depend on various factors. For example, the gateway 506, 508, or 510 may not to perform a band-switching operation and thus may transmit the communication on the same frequency band in the event it determines that the device that it received the communication from is a gateway node of the mesh network 500, as opposed to a network device, an access device, or other client device. In another example, the gateway 506, 508, or 510 may not perform a band-switching operation when it determines that a device that it will transmit the communication to is a gateway node of the mesh network 500. In another example, the gateway 506, 508, or 510 may perform a band-switching operation and may transmit the communication on a different frequency band when it determines that the device that it received the communication from is not a gateway node of the mesh network 500. In yet another example, the gateway 506, 508, or 510 may perform a band-switching operation and may transmit the communication on a different frequency band when it determines that the device that it will transmit the communication to is not a gateway node of the mesh network 500 and is connected to the mesh network on a different frequency band than the gateway 506, 508, or 510 used to receive the communication.

In one example, gateway 506 may receive a communication via a signal 520 transmitted from the access device 504. In some embodiments, the communication sent using signal 520 may include an instruction that a user of the access device 504 wants communicated to the network device 502. For example, the user may send the communication in order to cause the network device 502 to perform an operation, such as turn itself or another device on or off, change itself or another device to a different state, cause itself or another device to move to a different location, or the like. In some embodiments, the communication sent using signal 520 may include a request from the access device 504 to connect to the external network 512. The communication may be transmitted in a communication frame, such as a data frame, a control frame, a management frame, or the like. Data frames, control frames, management frames, or the like, may include 802.11 WiFi frames, Bluetooth frames, Zigbee frames, or the like. For example, the communication may be transmitted in a data frame, such as an 802.11 WiFi data frame, a Bluetooth data frame, a Zigbee data frame, or the like.

The communication sent using signal 520 may be received on a channel of a first WiFi frequency band using a first WiFi circuit that is configured to transmit and receive communications on the first WiFi frequency band. For example, the signal 520 may be received on channel 6 of the 2.4 GHz frequency band using a WiFi circuit configured to transmit and receive communications on the 2.4 GHz band. In some embodiments, the access device 504 may be connected to the gateway 506 via the "2GAccess" logical network described above, which operates on a 2.4 GHz band. One of ordinary skill in the art will appreciate that the access device 504 may be connected to the mesh network 500 using any other appropriate frequency band or network. As described above with respect to FIG. 4, client devices connecting to the mesh network 500 may select the channel or channels with which they will communication with the mesh network 500. For example, the access device 504 may select the channel taking into account the various performance factors described above with respect to FIG. 4. One or ordinary skill in the art will appreciate that other frequency bands and transceiver circuits may be used to transmit and receive the communication via signal 520, such as Bluetooth, Zigbee, or other frequency bands.

The gateway 506 may determine that the access device 504 is not a node of the mesh network 500. For example, the gateway 506 may be configured to monitor incoming communications in order to determine whether the communications are received from a gateway node, a client device, or network. In some embodiments, the gateway 506 may make the determination based on a MAC address, an IP address, a serial number, or other identifier of the access device 504. The identifier may be transmitted along with the communication in the signal 520, or may be sent as a separate signal. For example, the communication may be included in a communication frame (e.g., data frame, control frame, management frame, or the like) with an information element that includes the identifier. As noted above, a communication frame may include a source address and a destination address. In this example, the source address may include the identifier of the access device 504 because the communication frame originated from the access device 504. In some embodiments, the gateway 506 may compare the identifier to a routing table, an index table, or other appropriate reference source to determine whether the access device 504 is a node of the mesh network. For example, the routing table, index table, or other reference source may include a list of identifiers, and may associate each identifier with or index each identifier to a corresponding device along with a type (e.g., gateway, access device, network device, or the like), a configuration, and any other appropriate characteristics of each device. In some embodiments, a node of the mesh network 500 may only include an identifier of a device in its routing table or other reference source if that device is connected to the node. For example, the routing table of the gateway 506 may include the identifier of the access device 504 because the access device 504 is connected to the gateway 506. In this example, the gateway 506 can determine that the access device 504 is not a node of the mesh network 500 because the identifier of the access device 504 in the communication packet is a source address.

Based on the determination that the access device 504 is not a node of the mesh network 500, the gateway 506 may perform a band-switching operation in order to switch frequency bands before transmitting the communication to a next node in the mesh network 500, to a client device connected to the mesh network 500, or to the external network 512. Using the example described above, the signal 520 may be received on a channel of the 2.4 GHz frequency band. The band-switching operation of the gateway 506 may determine that the band on which the signal 520 is sent is the 2.4 GHz frequency band. In the event the gateway 506 includes a single circuit for each available frequency band of a particular technology, the band-switching operation may determine another available frequency band on which to transmit the communication. For example, the gateway 506 may perform the band-switching operation in order to select and switch to a 5 GHz frequency band for transmitting the communication.

Prior to transmitting the communication, the gateway 506 may determine a path for the communication, such as whether to transmit the communication to a next node in the mesh network 500, to a client device connected to the mesh network 500, or to the external network 512. The gateway 506 may use a dynamic routing protocol to determine the path, such as HWMP. For example, the path may be determined using on-demand routing using Radio Metric On-Demand Distance Vector (RM-AODV), using pro-active routing, using tree-based routing, or any other appropriate routing technique or combination thereof. The determined path may be recorded in the routing table stored in the gateway 506. As explained above, in some embodiments, the communication may be destined for the network device 502, and thus the gateway 506 may determine the best node to which to transmit the communication so that it reaches the network device 502 as quickly and accurately as possible using the mesh network 500. In some embodiments, the communication may be intended for the external network 512. Information identifying the destination (e.g., the network device 502, the external network 512, or the like) for the communication may be included with the communication. For example, the communication may be included in a communication frame (e.g., a data frame, a control frame, a management frame, or the like) with an information element indicating a destination address (e.g., a MAC address, IP address, or the like) that belongs to a destination device, such as the network device 502 or a server in the external network 512. Because the mesh network 500 is set up as a daisy chain network, the only next gateway node available to relay the communication to the network device 502 is the gateway 508. In the event the external network 512 is the destination for the communication, the gateway 506 may transmit the communication directly to the external network 512.

Using the example with the network device 502 as the intended destination for the communication, the gateway 506 may transmit the communication to the gateway 508 on a channel of the 5 GHz frequency band. In one example, the communication may be transmitted on channel 136 of the 5 GHz frequency band. The communication may be transmitted using a WiFi circuit configured to transmit and receive communications over the 5 GHz frequency band. In some embodiments, the gateway 506 may communicate with the gateway 508 via the "5GMesh" logical network described above, which operates on the 5 GHz band. One of ordinary skill in the art will appreciate that the gateway 506 may communicate with the gateway 508 using any other appropriate frequency band or network. In some embodiments, the gateway 506 may also determine whether the gateway 508 is a node of the mesh network 500 in order to determine whether to perform a band-switching operation. However, in some cases, this determination is not required if a prior determination has been made that the access device 504 is not a node of the mesh network 500 because, in such cases, the gateway 506 may already have determined that a band-switching operation will be performed. In the event the external network 512 is the destination for the communication, the gateway 506 may transmit the communication to the external network 512 on the channel of the 5 GHz frequency band.

Upon receiving the communication via the signal 518 from gateway 506, the gateway 508 may determine that the gateway 506 is a node of the mesh network 500. For example, the gateway 508 may monitor incoming communications in order to determine whether the communications are received from a gateway node or a client device. In some cases, the gateway 508 may make the determination based on an address (e.g., a MAC address, an IP address, or the like), a serial number, or other identifier of the transmitting device, in this case the gateway 506. The identifier may be transmitted along with the communication in the signal 518, or may be sent as a separate signal. For example, the communication may be included in a communication frame (e.g., data frame, control frame, management frame, or the like) with an information element that includes the identifier. The gateway 508 may compare the identifier to a routing table, an index table, or other appropriate reference source to determine whether the gateway 506 is a node of the mesh network, similar to that described above.

The gateway 508 may determine a next path for the communication. For example, the gateway 508 may use a dynamic routing protocol to determine whether to transmit the communication to a next node in the mesh network 500 or to a client device connected to the mesh network 500. Because, in some examples, the communication is intended to be ultimately received and processed by the network device 502, and because the mesh network 500 is set up as a daisy chain network, the only next gateway node available to relay the communication to the network device 502 is the gateway 510.

The gateway 508 may then determine that the gateway 510 is also a node of the mesh network 500 using techniques similar to those used to determine that the gateway 506 is a node. Based on the determination that the gateways 506 and 510 are both nodes of the mesh network 500, the gateway 508 may decide not to perform any band-switching operations. As a result, the gateway 508 may transmit the communication via signal 516 to the gateway 510 on the same band on which the communication was received by the gateway 508. For example, continuing with the above example, the gateway 508 may transmit the communication via signal 516 on a channel of the 5 GHz frequency band (e.g., channel 136). In some embodiments, the gateway 508 may communicate with the gateway 510 via the "5GMesh" logical network described above, which operates on the 5 GHz band. One of ordinary skill in the art will appreciate that the gateway 508 may communicate with the gateway 510 using any other appropriate frequency band or network.

Upon receiving the communication via the signal 516 from gateway 508, the gateway 510 may determine that the communication is to be transmitted to the network device 502. For example, the communication or other information in the signal 516 may indicate the destination for the communication. As one example, the communication may be included in a communication frame (e.g., data frame, control frame, management frame, or the like) with an information element indicating a destination address (e.g., a MAC address, an IP address, or the like) that belongs to the network device 502. In another example, the gateway 510 may receive a separate signal that may indicate the destination for the communication. For example, a destination address of the network device 502 may be indicated in an information element of a communication frame sent separately from the communication.

The gateway 510 may then determine that the network device 502 is not a node of the mesh network 500. In some embodiments, the gateway 510 may retrieve a destination address (e.g., a MAC address, an IP address, or the like) from a communication frame that includes the communication destined for the network device 502. The gateway 510 may determine that the device is not a node of the mesh network 500 based on the destination address. For example, the gateway 510 may determine (e.g., using an index table or other appropriate reference source) that the destination address belongs to a client device and not a node of the mesh network 500. In some embodiments, the gateway 510 may determine an identity of the network device 502 based on an identifier of the network device 502 included in a communication received from the network device 502. For example, the gateway 510 may continuously or periodically monitor communications received from the network device 502 in order to determine an identity of the network device 502.

Upon determining that the network device 502 is not a node of the mesh network 500, the gateway 510 may determine if it must perform a band-switching operation in order to switch frequency bands before transmitting the communication to the network device 502. For example, as described above, the network device 502 may select the channel or channels with which it will communication with the gateway 510. Therefore, the gateway 510 may be required to perform a band-switching operation if the frequency band on which it received the signal 516 is a different band than the frequency band that the network device 502 selected to communicate with the gateway 510. In one example, the network device 502 may select a channel of the 2.4 GHz frequency band with which to communicate with the gateway 510. Using the example described above, the signal 516 may be received on a channel of the 5 GHz frequency band (e.g., channel 136). The band-switching operation of the gateway 510 may determine that the band on which the signal 516 is sent is the 5 GHz frequency band. In the event the gateway 510 includes a single circuit for each available frequency band of a particular technology, the band-switching operation may determine the frequency band on which to transmit the communication to the network device 502. For example, the gateway 510 may perform the band-switching operation in order to select and switch back to the 2.4 GHz frequency band for transmitting the communication to the network device 502.

The gateway 510 may then transmit the communication using signal 514 to the network device 502 on a channel of the 2.4 GHz band. In one example, the communication may be transmitted on channel 6 of the 2.4 GHz band. The communication may be transmitted using a WiFi circuit configured to transmit and receive communications over the 2.4 GHz frequency band. In some embodiments, the network device 502 may communicate with the gateway 510 via the "2GAccess" logical network described above, which operates on the 2 GHz band. One of ordinary skill in the art will appreciate that the network device 502 may communicate with the gateway 510 using any other appropriate frequency band or network. In some embodiments, the gateway 510 may further determine whether the gateway 508 is a node of the mesh network 500 in order to determine whether to perform a band-switching operation. This determination is not required if a prior determination has been made that the network device 502 is not a node of the mesh network 500.

In another example, the network device 502 may select a channel of the 5 GHz frequency band with which to communicate with the gateway 510. Using the above-described example in which the signal 516 is sent to the gateway 510 using the 5 GHz frequency band, the gateway 510 may determine that it does not need to perform a band-switching operation before sending the signal 514 to the network device 502 because the connection between the network device 502 and the gateway 510 is over the 5 GHz frequency band. The gateway 510 may then transmit the communication using signal 514 to the network device 502 on a channel of the 5 GHz frequency band, such as channel 136 of the 5 GHz band. The communication may be transmitted using a WiFi circuit configured to transmit and receive communications over the 5 GHz frequency band. In some embodiments, the network device 502 may communicate with the gateway 510 via the "5GAccess" logical network described above, which operates on the 5 GHz band. One of ordinary skill in the art will appreciate that the network device 502 may communicate with the gateway 510 using any other appropriate frequency band or network.

Once the network device 502 receives the communication via signal 514, the network device 502 may process the signal and perform the necessary functions to satisfy the instruction indicated in the communication sent by the user of the access device 504.

FIG. 6 illustrates another example of a mesh network 600. The mesh network 600 includes gateways 606, 608, 610, and 612 that can selectively perform the band-switching operations described above taking into account various factors. The gateways 606, 608, 610, and 612 are arranged in a mesh arrangement, with each gateway 606, 608, 610, 612 being connected to each of the other gateways 606, 608, 610, 612. Each gateway 606, 608, 610, 612 is a node of the mesh network 600. Similar to the mesh network 500, the mesh network 600 also includes a network device 602, an access device 604, and a network 614. The gateways 606, 608, 610, 612, the network device 602, the access device 604, and the external network 614 are all similar and have the same functionalities and capabilities as the gateways 506, 508, 510, the network device 502, the access device 504, and the external network 512 described above with respect to FIG. 5. It should be appreciated that the mesh network 600 may have other components than those depicted. Further, the embodiment shown in the figure is only one example of a mesh network that may incorporate an embodiment of the invention. In some other embodiments, mesh network 600 may have more or fewer components than shown in the figure, may combine two or more components, or may have a different configuration or arrangement of components.

While only a single network device 602 and a single access device 604 are shown in FIG. 6, one of ordinary skill in the art will appreciate that multiple network devices and multiple access devices may be connected with the mesh network 600. Furthermore, while four gateways 606, 608, 610, and 612 are shown in FIG. 6, one of ordinary skill in the art will appreciate that any number of gateways may be present within the mesh network 600.

The wireless network provided by gateways 606, 608, 610, 612 may be any type of network familiar to those skilled in the art that can support data communications using any of a variety of commercially-available protocols. For example, gateways 606, 608, 610, 612 may provide wireless communication capabilities for the mesh network 600 using particular communications protocols, such as WiFi™ (e.g., IEEE 802.11 family standards, such as 802.11a, 802.11b, 802.11g, 802.11n, 802.11 ac, or the like), or other communications transport technologies, or any combination thereof. Using the communications protocol(s), the gateways 606, 608, 610, 612 may provide radio frequencies on which wireless enabled devices in the mesh network 600 can communicate. The gateways 606, 608, 610, 612 may communicate with each other and with the network devices and access devices using the wireless communications protocols.

The gateways 606, 608, 610, 612 may also provide the access device 604 and the network device 602 with access to one or more external networks, such as the external network 614, which may include a cloud network, the Internet, and/or other wide area networks. The network 614 may be similar to the cloud network 114 described with respect to FIG. 1. Gateway 606, which may be a router gateway, is connected to the network 614 (via a wired or wireless connection), and provides the other gateways 608, 610, 612 with access to the network 614. Once the gateways 608, 610, 612 have access to the external network 614 via gateway 606, any of the gateways 606, 608, 610, 612 may provide other devices (e.g., other gateways, network device, access devices, or the like) with access to the external network 614. For example, each of the nodes in the mesh network 600 (e.g., gateways 606, 608, 610) may share the connection to the network 614 with one or more nodes closest to them.

Each gateway 606, 608, 610, 612 is a node of the mesh network 600. The gateways 606, 608, 610, 612 may include a router, an access point, a modem, a range extending device, and/or any other device that provides wireless network access among one or more computing devices and/or external networks. For example, gateway 606 may include a router or access point for providing the other nodes of the mesh network 600 with access to the external network 614, and may be similar to the gateway 506 described above with respect to FIG. 5. Gateways 608, 610, 612 may include an access point or range extending device, and may be similar to the gateways 508, 510 described above with respect to FIG. 5. In some embodiments, other devices may act as nodes of the network. For example, an access device, network device, or other client device may be set up as a node that provides other devices with access to the mesh network 600.

The gateways 606, 608, 610, 612 may include one or more transceiver radio circuits for each frequency band of a particular technology (e.g., one or more WiFi circuits, Zigbee circuits, Bluetooth circuits, or the like). For example, gateways 606, 608, 610, 612 may include two or more circuits for each frequency band of a particular technology or may include a single circuit for each available frequency band of a particular technology. As one example, each of the gateways 606, 608, 610, 612 may include a single WiFi circuit for the 2.4 GHz frequency band and a single WiFi circuit for the 5 GHz frequency band.

Similar to the mesh nodes described with respect to FIG. 5, the gateways 606, 608, 610, 612 may have a routing table and may be programmed with a dynamic routing protocol (e.g., using programs, software, or the like) that enables the gateways 606, 608, 610, 612 to interact within the larger mesh network 600. The routing table and dynamic routing protocol are similar to those described above with respect to FIG. 5. For example, the routing table includes the MAC address and IP address of each mesh node in the mesh network 600, and the MAC address and IP address of each device (e.g., network device 602, access device 604, or another device connected to the mesh network 600) connected to nodes of the mesh network 600. Information is communicated across the mesh network 600 from node to node (gateway to gateway) by hopping wirelessly from one mesh node to the next. Each gateway 606, 608, 610, 612 node may discover and track neighboring nodes using the dynamic routing protocol. For example, the gateways 606, 608, 610, 612 may use the dynamic routing protocol to exchange information about networks with which they are connected, information about destination addresses seen in received communication packets, and other appropriate information. The gateways 606, 608, 610, 612 may be configured to automatically select an appropriate or best path through the network 600 (e.g., the quickest path, most reliable path, less congested path, a combination thereof, or the like) using the dynamic routing protocol. In some embodiments, the dynamic routing protocol may be used to determine a next-best path if a determined best path to a destination becomes unusable. In some embodiments, a client device (e.g., a network device, an access device, or the like) may be programmed with the dynamic routing protocol and may be able to select an appropriate or best path through the mesh network 600. In some embodiments, the gateways 606, 608, 610, 612, and/or the access device 604 and network device 602, may operate using a HWMP protocol defined in IEEE 802.11s. One of ordinary skill in the art will appreciate that any other appropriate routing protocol may be used.

The gateways 606, 608, 610, 612 may operate on multiple bands, including any number of bands across any number of multiple wireless or other transport technologies. In some examples, the gateways 606, 608, 610, 612 may operate on dual-bands. For example, the gateways 606, 608, 610, 612 may communicate with one another and with other devices using the 2.4 GHz and 5 GHz WiFi bands. In other examples, the gateways 606, 608, 610, 612 may operate on multiple frequency bands of other transport technologies, such as Bluetooth™ or Zigbee™, including frequency bands that are currently available or that become available in the future. One of ordinary skill in the art will appreciate that any other combination of frequency bands may be used in any wireless or transport technology. Accordingly, the gateways 606, 608, 610, 612 may be setup and connected to each other, and to the network device 602 and access device 604, with the multiple bands enabled.

Similar to that discussed above with respect to FIG. 5, the gateways 606, 608, 610, 612 may broadcast multiple communications networks on the same channel for each frequency band provided by the gateways 606, 608, 610, 612, with each of the communications networks for each frequency band being a different logical network. One of the logical networks for a channel of a frequency band may be a mesh logical network, and another of the logical networks for the channel of the frequency band may be an access logical network.

The gateways 606, 608, 610, 612 can perform the band-switching operations described above with respect to FIG. 4, and can also selectively determine whether to perform band-switching operations similar to that described above with respect to FIG. 5.

In one example, gateway 612 may receive a communication from the network device 602. The communication may be transmitted from the network device 602 using a signal 616. In some embodiments, the communication sent using signal 616 may include an instruction, a notification, or some other communication that the network device 602 has addressed to the access device 604. For example, the communication may include a notification notifying a user of the access device 604 that the network device is powering off, has recently powered on, is performing an action, or the like. In some embodiments, the communication sent using signal 616 may include a request from the network device 602 to connect to the external network 614. The communication may be transmitted in a communication frame, such as a data frame, a control frame, a management frame, or the like. Data frames, control frames, management frames, or the like, may include 802.11 WiFi frames, Bluetooth frames, Zigbee frames, or the like. For example, the communication may be transmitted via signal 616 in a data frame, such as an 802.11 WiFi data frame, a Bluetooth data frame, a Zigbee data frame, or the like.

The communication sent using signal 616 may be received on a channel of a first WiFi frequency band using a first WiFi circuit that is configured to transmit and receive communications on the first WiFi frequency band. For example, the signal 616 may be received on channel 6 of the 2.4 GHz frequency band using a WiFi circuit configured to transmit and receive communications on the 2.4 GHz band. In some embodiments, the network device 602 may be connected to the gateway 612 via the "2GAccess" logical network described above, which operates on a 2.4 GHz band. One of ordinary skill in the art will appreciate that the network device 602 may be connected to the mesh network 600 using any other appropriate frequency band or network. As described above with respect to FIG. 4, client devices connecting to the mesh network 600 may select the channel or channels with which they will communication with the mesh network 600. For example, the network device 602 may select the channel taking into account the various performance factors described above with respect to FIG. 4. One or ordinary skill in the art will appreciate that other frequency bands and transceiver circuits may be used to transmit and receive the communication via signal 616, such as Bluetooth, Zigbee, or other frequency bands.

The gateway 612 may determine that the network device 602 is not a node of the mesh network 600. For example, the gateway 612 may monitor incoming communications in order to determine whether the communications are received from a gateway node, a client device, or an external network (e.g., a wide area network). In some embodiments, the gateway 612 may make the determination based on a MAC address, an IP address, a serial number, or other identifier of the network device 602. The identifier may be transmitted along with the communication in the signal 616, or may be sent as a separate signal. For example, the communication may be included in a communication frame (e.g., data frame, control frame, management frame, or the like) with an information element that includes the identifier. As noted above, a communication frame may include a source address and a destination address. In this example, the source address may include the identifier of the network device 602 because the communication frame originated from the network device 602. In some embodiments, the gateway 612 may compare the identifier to a routing table, an index table, or other appropriate reference source to determine whether the network device 602 is a node of the mesh network. For example, the routing table, the index table, or other reference source may include a list of identifiers, with each identifier being associated with or indexed to a corresponding device along with a type (e.g., gateway, access device, network device, or the like), a configuration, and any other appropriate characteristics of each device. In some embodiments, a node of the mesh network 600 may only include an identifier of a device in its routing table or other reference source if that device is connected to the node. For example, the routing table of the gateway 612 may include the identifier of the network device 602 because the network device 602 is connected to the gateway 612. In this example, the gateway 612 can determine that the network device 602 is not a node of the mesh network 600 because the identifier of the network device 602 in the communication packet is a source address.

Based on the determination that the network device 602 is not a node of the mesh network 600, the gateway 612 may perform a band-switching operation to switch frequency bands before transmitting the communication to a next node in the mesh network 600 or to a client device connected to the mesh network 600. Using the example described above, the signal 616 may be received by the gateway 612 on a channel of the 2.4 GHz frequency band. The band-switching operation of the gateway 612 may determine that the band on which the signal 616 is sent is the 2.4 GHz frequency band. In the event the gateway 612 includes a single circuit for each available frequency band of a particular technology, the band-switching operation may determine another available frequency band on which to transmit the communication. For example, the gateway 612 may perform the band-switching operation in order to select and switch to a 5 GHz frequency band for transmitting the communication.

Prior to transmitting the communication, the gateway 612 may determine a path for the communication, such as whether to transmit the communication to a next node in the mesh network 600 or to a client device connected to the mesh network 600. The gateway 612 may use a dynamic routing protocol to determine the path, such as HWMP. For example, the path may be determined using on-demand routing using RM-AODV, using pro-active routing, using tree-based routing, or any other appropriate routing technique or combination thereof. The determined path may be recorded in the routing table stored in the gateway 612. As described above, in some embodiments, the communication may be destined for the access device 604, and thus the gateway 612 may determine the best node to which to transmit the communication so that it reaches the access device 604 as quickly and accurately as possible using the mesh network 600. In some embodiments, the communication may be intended for the external network 614. Information identifying the destination (e.g., the access device 604, the external network 614, or the like) for the communication may be included with the communication. For example, the communication may be included in a communication frame (e.g., a data frame, a control frame, a management frame, or the like) with an information element indicating a destination address (e.g., a MAC address, IP address, or the like) that belongs to a destination device, such as the access device 604 or a server in the external network 614.

The mesh network 600 is set up in a mesh arrangement with each gateway 606, 608, 610, 612 being connected to each of the other gateways 606, 608, 610, 612. Accordingly, there are multiple potential pathways for the gateway 612 to choose for transmitting the communication. For example, the gateway 612 may send the communication directly to gateway 606. In other examples, the gateway 612 may send the communication to gateway 608 or to gateway 610. As noted above, each gateway 606, 608, 610, 612 node may discover and track neighboring nodes using a dynamic routing protocol, such as a HWMP protocol defined in IEEE 802.11s. The gateway 612 may determine the quality of a connection with each of the gateways 606, 608, 610. The gateway 612 may select a path based on the quality of the connection with each gateway 606, 608, 610 (e.g., based on throughput, latency, or the like), based on the number of hops required to reach the destination using each path, and any other appropriate metric considered in the dynamic routing protocol. The gateway 612 may select an appropriate path through the network 600 using these metrics, such as the quickest, most reliable path. In the embodiment illustrated in FIG. 6, the gateway 612 may select gateway 608 as the best node to which to send the communication. For example, the gateway 612 may select gateway 608 based on the quality of the connection between gateways 612 and 608 despite the quickest path being straight to gateway 606.

In an example with the access device 604 as the intended destination for the communication, the gateway 612 may transmit the communication using signal 618 to the gateway 608 on a channel of the 5 GHz frequency band. In one example, the communication may be transmitted on channel 44 of the 5 GHz frequency band. The communication may be transmitted using a WiFi circuit configured to transmit and receive communications over the 5 GHz frequency band. In some embodiments, the gateway 612 may communicate with the gateway 608 via the "5GMesh" logical network described above, which operates on the 5 GHz band. One of ordinary skill in the art will appreciate that the gateway 612 may communicate with the gateway 608 using any other appropriate frequency band or network. In some embodiments, the gateway 612 may also determine whether the gateway 608 is a node of the mesh network 600 in order to determine whether to perform a band-switching operation. In some cases, this determination is not required if a prior determination has been made that the network device 602 is not a node of the mesh network 600 because, in such cases, the gateway 612 may already have determined that a band-switching operation will be performed. In the event the external network 614 is the destination for the communication, the gateway 612 may also select the gateway 608 as the next node, and may transmit the communication to the gateway 608 on the channel of the 5 GHz frequency band.

Upon receiving the communication via the signal 618 from gateway 612, the gateway 608 may determine that the gateway 612 is a node of the mesh network 600. For example, the gateway 608 may monitor incoming communications in order to determine whether the communications are received from a gateway node or a client device. In some cases, the gateway 608 may make the determination based on an address (e.g., a MAC address, an IP address, or the like), a serial number, or other identifier of the gateway 612. The identifier may be transmitted along with the communication in the signal 618, or may be sent as a separate signal. For example, the communication may be included in a communication frame (e.g., data frame, control frame, management frame, or the like) with an information element that includes the identifier. The gateway 608 may compare the identifier to a routing table, an index table, or other appropriate reference source to determine whether the gateway 612 is a node of the mesh network, similar to that described above.

The gateway 608 may determine a next path for the communication. For example, the gateway 608 may use a dynamic routing protocol to determine whether to transmit the communication to a next node in the mesh network 600 or to a client device connected to the mesh network 600. The gateway 608 may determine whether to transmit the communication to gateway 610 or to gateway 606. In the embodiment illustrated in FIG. 6, the gateway 608 may select gateway 606 as the best node to which to send the communication. The determination may be based on the fact that the number of hops from gateway 608 directly to gateway 606 is one hop, whereas the number of hops required to go through gateway 610 to gateway 606 is two hops. The determination may also be based on the quality of the connection between gateways 608 and 606.

The gateway 608 may then determine that the gateway 606 is also a node of the mesh network 600 using techniques similar to those used to determine that the gateway 612 is a node. Based on the determination that the gateways 612 and 606 are both nodes of the mesh network 600, the gateway 608 may determine not to perform any band-switching operations. Based on this determination, the gateway 608 may transmit the communication via signal 620 to the gateway 606 on the same band on which the communication was received by the gateway 608. For example, continuing with the above example, the gateway 608 may transmit the communication via signal 620 on a channel of the 5 GHz frequency band (e.g., channel 44). In some embodiments, the gateway 608 may communicate with the gateway 606 via the "5GMesh" logical network described above, which operates on the 5 GHz band. One of ordinary skill in the art will appreciate that the gateway 608 may communicate with the gateway 606 using any other appropriate frequency band or network.

Once the gateway 606 receives the communication via the signal 620 from gateway 608, the gateway 606 may determine whether the communication is to be transmitted to the network device 604, to the network 614, or to another network device, client device, or gateway. For example, the communication or other information in the signal 620 may indicate the destination for the communication. As one example, the communication may be included in a communication frame (e.g., data frame, control frame, management frame, or the like) with an information element indicating a destination address (e.g., a MAC address, an IP address, or the like) that belongs to the access device 604. In another example, the gateway 606 may receive a separate signal that may indicate the destination for the communication. For example, a destination address of the access device 604 may be indicated in an information element of a communication frame sent separately from the communication. In embodiments in which the network 614 is the destination for the communication, a destination IP address or other identifier of a server in the network 614 may be included in an information element of a communication frame sent with the communication or separately from the communication.

In the event the access device 604 is the destination for the communication, the gateway 606 may then determine that the access device 604 is not a node of the mesh network 600. In some embodiments, the gateway 606 may retrieve a destination address (e.g., a MAC address, an IP address, or the like) from a communication frame that includes the communication destined for the access device 604. The gateway 606 may determine that the device is not a node of the mesh network 600 based on the destination address. For example, the gateway 606 may determine (e.g., using an index table or other appropriate reference source) that the destination address belongs to a client device and not a node of the mesh network 600. In some embodiments, the gateway 606 may determine an identity of the access device 604 based on an identifier of the access device 604 included in a communication received from the network device 604. For example, the gateway 606 may continuously or periodically monitor communications received from the access device 604 in order to determine an identity of the access device 604.

In the event the external network 614 is the destination for the communication, the gateway 606 may determine that external network 614 is not a node of the mesh network 600. In some embodiments, the gateway 606 may retrieve a destination address (e.g., an IP address, or the like) from a communication frame that includes the communication destined for the external network 614. The gateway 606 may determine that the external network 614 is not a node of the mesh network 600 based on the destination address. For example, the gateway 606 may reference an index table or other appropriate reference source in order to determine that the destination address belongs to a server of the external network 614. In some embodiments, the gateway 606 may recognize the absence of a MAC address in a recipient address field that indicates the address of the next recipient of the communication. For example, the recipient address field may include an IP address instead of a MAC address. Because a MAC address is absent, the gateway 606 may determine that the recipient is not a node of the mesh network 600 because all nodes of the mesh network 600 include a MAC address.

Using the example in which the access device 604 is the destination for the communication, the gateway 606 may determine if it must perform a band-switching operation upon determining that the access device 604 is not a node of the mesh network 600. For example, as described above, the access device 604 may select the channel or channels with which it will communication with the gateway 606. Therefore, the gateway 606 may be required to perform a band-switching operation if the frequency band on which it received the signal 620 is a different band than the frequency band that the access device 604 selected to communicate with the gateway 606. In one example, the access device 604 may select a channel of the 2.4 GHz frequency band with which to communicate with the gateway 606. Using the band-switching operation, the gateway 606 may switch frequency bands before transmitting the communication to the access device 604. The signal 620 may be received on a channel of the 5 GHz frequency band (e.g., channel 44) due to the prior band-switching operation being performed by the gateway 612. The band-switching operation of the gateway 606 may determine that the band on which the signal 620 is sent is the 5 GHz frequency band. In the event the gateway 606 includes a single circuit for each available frequency band of a particular technology, the band-switching operation may determine the frequency band on which to transmit the communication to the access device 604. For example, the gateway 606 may perform the band-switching operation in order to select and switch back to the 2.4 GHz frequency band for transmitting the communication to the access device 604.

The gateway 606 may then transmit the communication using signal 624 to the access device 604 on a channel of the 2.4 GHz band. In one example, the communication may be transmitted on channel 6 of the 2.4 GHz band. The communication may be transmitted using a WiFi circuit configured to transmit and receive communications over the 2.4 GHz frequency band. In some embodiments, the access device 604 may communicate with the gateway 606 via the "2GAccess" logical network described above, which operates on the 2 GHz band. One of ordinary skill in the art will appreciate that the access device 604 may communicate with the gateway 606 using any other appropriate frequency band or network. In some embodiments, the gateway 606 may further determine whether the gateway 608 is a node of the mesh network 600 in order to determine whether to perform a band-switching operation. This determination is not required if a prior determination has been made that the access device 604 is not a node of the mesh network 600.

In another example, the access device 604 may select a channel of the 5 GHz frequency band with which to communicate with the gateway 606. Using the above-described example in which the signal 620 is sent to the gateway 606 using the 5 GHz frequency band, the gateway 606 may determine that it does not need to perform a band-switching operation before sending the signal 624 to the access device 604 because the connection between the access device 604 and the gateway 606 is over the 5 GHz frequency band. The gateway 606 may then transmit the communication using signal 624 to the access device 604 on a channel of the 5 GHz frequency band, such as channel 44 of the 5 GHz band. The communication may be transmitted using a WiFi circuit configured to transmit and receive communications over the 5 GHz frequency band. In some embodiments, the access device 604 may communicate with the gateway 606 via the "5GAccess" logical network described above, which operates on the 5 GHz band. One of ordinary skill in the art will appreciate that the access device 604 may communicate with the gateway 606 using any other appropriate frequency band or network.

Once the access device 604 receives the communication via signal 624, the access device 604 may process the signal and perform the necessary functions to satisfy the instruction, notification, or other request indicated in the communication transmitted by the network device 602. For example, network device 602 may display a notification notifying a user of the access device 604 that the network device is powering off, has recently powered on, is performing an action, or the like.

In some embodiments, other factors may be considered by a gateway when determining whether to perform a band-switching operation to transmit a communication on a different frequency band or to refrain from performing a band-switching operation and transmitting the communication on the same frequency band. For example, other factors may include time, speed, noise, number of nodes of the mesh network, a combination thereof, or any other appropriate factors. In one example, a gateway may switch frequency bands after a predetermined amount of time has passed since the frequency bands were last switched, such as 30 seconds, 1 minute, 2 minutes, 5 minutes, or any other appropriate amount of time. In another example, a gateway may switch frequency bands if the gateway is connected to a small number of nodes, such as three or less. In yet another example, a gateway may switch frequency bands if it determines that a different frequency band will achieve a higher throughput rate or less delay than the currently used frequency band.

According to the selective band-switching operations described above with respect to FIGS. 5 and 6, the frequency band on which a communication is communicated may be switched when the communication is received into a mesh network and/or when the communication is transmitted from the mesh network. As a result, the communication is transmitted amongst the nodes of the mesh network using a common frequency band. By selectively performing band-switching operations, faster throughput may be achieved by switching bands on the periphery of the mesh network (when a communication is received by and/or transmitted from the mesh network) and not switching bands while the communication is communicated among the nodes of the mesh network. For example, if the gateways 612, 608, and 606 switched bands each time they received and transmitted a signal, throughput may drop due to inefficiencies caused by the gateways having to operate on both frequency bands on each side at the same time. Accordingly, the benefits of band-switching operations may be achieved using a mesh network without creating inefficiencies among the nodes of the mesh network.

FIG. 7 illustrates an embodiment of a process 700 for selectively performing one or more band-switching operations. While specific examples may be given of a mesh network node, such as a gateway, performing the process 700, one of ordinary skill in the art will appreciate that other devices may perform the process 700, such as a network device, an access device, or the like. For example, a network device or access device may act as an access point in a mesh network. In some aspects, the process 700 may be performed by a computing device, such as a gateway 506, 508, 510, 606, 608, 610, or 612, a network device 502 or 602, or an access device 504 or 604 shown in FIGS. 5-6.

Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 702, the process 700 includes receiving, on a computing device, a communication from a first device. The communication is received on a channel of a first WiFi frequency band, and is received using a first WiFi circuit of the computing device. The computing device is a node of a mesh network. In some embodiments, the computing device includes a gateway, such as gateway 506 illustrated in FIG. 5 or gateway 612 illustrated in FIG. 6. In some embodiments, the first device may include a gateway that may be a node of the mesh network. In some embodiments, the first device may include a client device, such as the access device 504 of FIG. 5 or the network device 602 of FIG. 6. The first device may determine or select the first WiFi frequency band based on a configuration of the first device and/or various performance factors, as described above with respect to FIG. 4, for example. In some cases, the communication may be received on a channel of the 2.4 GHz frequency band, similar to the examples provided in FIGS. 5-6. In other cases, the communication may be received on a channel of the 5 GHz frequency band.

At 704, the process 700 includes determining whether the first device is a node of the mesh network. In some embodiments, the computing device may monitor incoming communications in order to determine whether the communications are received from a gateway node of the mesh network, a client device, or an external network (e.g., a wide area network). For example, the computing device may make the determination based on a MAC address, an IP address, a serial number, or other identifier of the first device. The identifier may be transmitted along with the communication, or may be sent as a separate signal. For example, the communication may be included in a communication frame (e.g., data frame, control frame, management frame, or the like) with an information element that includes the identifier. The computing device may compare the identifier to a routing table, an index table, or other appropriate reference source to determine whether the first device is a node of the mesh network. For example, the index table or other reference source may include a list of identifiers, and may associate each identifier with or index each identifier to a corresponding device along with a type (e.g., gateway, access device, network device, or the like), a configuration, and any other appropriate characteristics of each device. In some embodiments, a node of the mesh network may only include an identifier of a device in its routing table or other reference source if that device is connected to the node. For example, the routing table of the computing device may include the identifier of the first device if the first device is connected to the computing device. In this example, the computing device may determine that the first device is not a node of the mesh network if the identifier of the access device in the communication packet is in its routing table and is a source address. In one example, the computing device may be the gateway 612 and the first device may be the network device 602. The gateway 612 may determine that the network device 602 is not a node of the mesh network 600. In another example, the computing device may be the gateway 608 and the first device may be the gateway 612, in which case the gateway 608 may determine that the gateway 612 is a node of the mesh network 600.

At 706, the process 700 includes determining a second device to which to transmit the communication. In some examples, the process 700 may determine that the second device to transmit the communication to is a next node in the mesh network, a client device connected to the mesh network, or a server of an external network. For example, the computing device may determine the second device based on a determined best path for the communication to travel to reach a destination for the communication. Information identifying the destination for the communication may be included with the communication. For example, the communication may be included in a communication frame (e.g., a data frame, a control frame, a management frame, or the like) with an information element indicating a destination address (e.g., a MAC address, IP address, or the like) that belongs to a destination device.

Based on the destination for the communication, the process 700 may determine the best path for the communication to travel. The routing table in the computing device may be used to determine the best path for the communication. In some embodiments, the mesh network may be arranged in a daisy-chain arrangement with each gateway being connected to one or two other gateways, in which case only one path may be possible. In some embodiments, the mesh network may be arranged in a mesh arrangement with each gateway being connected to each of the other gateways, a mesh arrangement with each gateway being connected to three or more other gateways, or any other mesh arrangement. In such embodiments, multiple potential pathways may be available for the computing device to choose for transmitting the communication. As described above, the computing device may use a dynamic routing protocol to determine the best path to reach the destination. The dynamic routing protocol may include HWMP defined by IEEE 802.11s. For example, the path may be determined using on-demand routing using RM-AODV, using proactive routing, using tree-based routing, or any other appropriate routing technique or combination thereof. In one example, the computing device may be the gateway 612, the first device may be the network device 602, and the second device may be determined to be the gateway 608. In another example, the computing device may be the gateway 608, the first device may be the gateway 612, and the second device may be determined to be the gateway 606.

At 708, the process 700 includes determining whether the second device is a node of the mesh network. Similar to step 704, the computing device may monitor incoming communications in order to determine whether the communications are received from a gateway node of the mesh network, a client device, or an external network (e.g., a wide area network). For example, the computing device may make the determination based on a MAC address, an IP address, a serial number, or other identifier of the second device. The identifier may be transmitted in a communication frame (e.g., data frame, control frame, management frame, or the like) along with the communication, or in a communication frame sent separately from the communication. The computing device may compare the identifier to a routing table, an index table, or other appropriate reference source to determine whether the second device is a node of the mesh network, similar to that described above. In one example, the computing device may be the gateway 612 and the second device may be the gateway 608. The gateway 612 may determine that the gateway 608 is a node of the mesh network 600. In another example, the computing device may be the gateway 608 and the second device may be the gateway 606, in which case the gateway 608 may determine that the gateway 606 is a node of the mesh network 600.

At 708, the process 700 includes determining whether to transmit the communication to the second device on a second WiFi frequency band. The second WiFi frequency band is different from the first WiFi frequency band. The determination of whether to transmit the communication on the second WiFi frequency band depends on whether the first device or the second device is a node of the mesh network. In some examples, the process 700 may include transmitting the communication to the second device on the first WiFi frequency band when it is determined that the first device and the second device are both nodes of the mesh network. For example, the computing device may be the gateway 608, the first device may be the gateway 612, and the second device may be determined to be the gateway 606. In this example, the process 700 may determine not to perform a band-switching operation and may thus transmit the communication to the gateway 606 on the first WiFi frequency band. In other examples, the process 700 may include transmitting the communication to the second device on the second WiFi frequency band when it is determined that the first device is not a node of the mesh network, in which cases the communication is transmitted on a channel of the second WiFi frequency band and the communication is transmitted using a second WiFi circuit of the computing device. For example, the computing device may be the gateway 612, the first device may be the network device 602, and the second device may be the gateway 608. In this example, the process 700 may perform a band-switching operation and may transmit the communication to the gateway 608 on the second WiFi frequency band. In other examples, the process 700 may include transmitting the communication to the second device on the second WiFi frequency band when it is determined that the first device is a node of the mesh network, when it is determined that the second device is not a node of the mesh network, and when the second device is connected to the mesh network using the second WiFi frequency band, in which cases the communication is transmitted on a channel of the second WiFi frequency band and the communication is transmitted using a second WiFi circuit of the computing device. For example, as described above, the second device may select the channel or channels with which it will communication with the computing device. Therefore, the computing device may be required to perform a band-switching operation if the frequency band on which it received the communication is a different band than the frequency band that the second device selected to communicate with the computing device.

Accordingly, the process 700 selectively performs band-switching operations. Other factors may be taken into account when determining whether to switch bands, as described above with respect to FIGS. 5 and 6. Devices that are not nodes of the mesh network may include a network device, an access device, a server of a wide area network, or any other device that does not make up the mesh network infrastructure.

Various frequency bands may be switched to when performing a band-switching operation. For example, when the first WiFi frequency band includes a 2.4 gigahertz frequency band, the second WiFi frequency band may include a 5 gigahertz frequency band. In another example, when the first WiFi frequency band includes a 5 gigahertz frequency band, the second WiFi frequency band includes a 2.4 gigahertz frequency band. One of ordinary skill in the art will appreciate that band-switching operations can be performed on other frequency bands, including those that are currently in use or that may become available at a future date The first WiFi circuit and the second WiFi circuit may each include a transceiver radio and other related circuitry for transmitting and receiving signals on channels of the corresponding frequency band. In some embodiments, the computing device may include a single WiFi circuit (the first WiFi circuit) for the first frequency band, and a single circuit (the second WiFi circuit) for the second frequency band. In some embodiments, the computing device includes multiple circuits for each of the first WiFi frequency band and the second WiFi frequency band. In such embodiments, the computing device may perform channel-switching operations, as described above.

Figure 8:
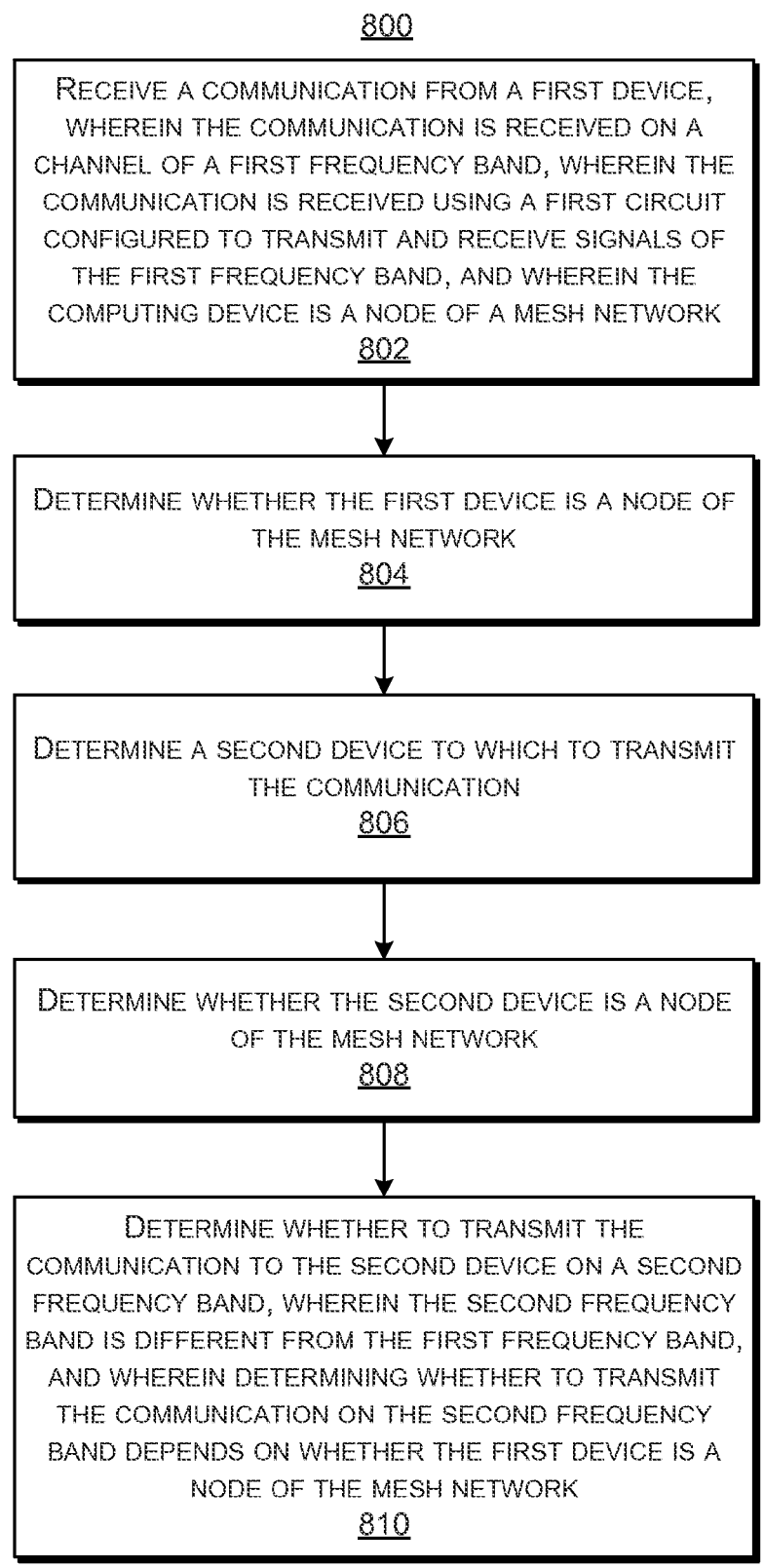
FIG. 8 is a flowchart illustrating another embodiment of a process for determining whether to switch frequency bands, in accordance with some embodiments.

FIG. 8 illustrates an embodiment of a process 800 for selectively performing one or more band-switching operations. While specific examples may be given of a gateway performing the process 800, one of ordinary skill in the art will appreciate that other devices may perform the process 800, such as a network device, an access device, or the like. For example, a network device or access device may act as an access point in a mesh network. In some aspects, the process 800 may be performed by a computing device, such as a gateway 506, 508, 510, 606, 608, 610, or 612, a network device 502 or 602, or an access device 504 or 604 shown in FIGS. 5-6.

Process 800 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 802, the process 800 includes receiving, on a computing device, a communication from a first device. The communication is received on a channel of a first frequency band, and is received using a first circuit configured to transmit and receive signals of the first frequency band. The computing device is a node of a mesh network. For example, a group of WiFi gateways, Bluetooth gateways, Zigbee gateways, or gateways of other transport technologies may make up the nodes of the mesh network. In some embodiments, the computing device includes a gateway, such as gateway 506 illustrated in FIG. 5 or gateway 612 illustrated in FIG. 6. In some embodiments, the first device may include a gateway that may be a node of the mesh network. In some embodiments, the first device may include a client device, such as the access device 504 of FIG. 5 or the network device 602 of FIG. 6. The first device may determine or select the first frequency band based on a configuration of the client device and/or various performance factors, as described above with respect to FIG. 4, for example. In some cases, the first frequency band may include a frequency band of a first transport technology, such as a WiFi™, a Zigbee™, or a Bluetooth™ frequency band, and the first circuit may include a WiFi™, a Zigbee™, or a Bluetooth™ transceiver radio circuit.

At 804, the process 800 includes determining whether the first device is a node of the mesh network. In some embodiments, the computing device may monitor incoming communications in order to determine whether the communications are received from a gateway node of the mesh network, a client device, or an external network (e.g., a wide area network). For example, the computing device may make the determination based on a MAC address, an IP address, a serial number, or other identifier of the first device. The identifier may be transmitted along with the communication, or may be sent as a separate signal. For example, the communication may be included in a communication frame (e.g., data frame, control frame, management frame, or the like) with an information element that includes the identifier. The computing device may compare the identifier to a routing table, an index table, or other appropriate reference source to determine whether the first device is a node of the mesh network. For example, the index table or other reference source may include a list of identifiers, and may associate each identifier with or index each identifier to a corresponding device along with a type (e.g., gateway, access device, network device, or the like), a configuration, and any other appropriate characteristics of each device. In some embodiments, a node of the mesh network may only include an identifier of a device in its routing table or other reference source if that device is connected to the node. For example, the routing table of the computing device may include the identifier of the first device if the first device is connected to the computing device. In this example, the computing device may determine that the first device is not a node of the mesh network if the identifier of the access device in the communication packet is in its routing table and is a source address.

At 806, the process 800 includes determining a second device to which to transmit the communication. In some examples, the process 800 may determine that that the second device to which to transmit the communication is a next node in the mesh network, a client device connected to the mesh network, or a server of an external network. For example, the computing device may determine the second device based on a determined best path for the communication to travel to reach a destination for the communication. Information identifying the destination for the communication may be included with the communication. For example, the communication may be included in a communication frame (e.g., a data frame, a control frame, a management frame, or the like) with an information element indicating a destination address (e.g., a MAC address, IP address, or the like) that belongs to a destination device.

Based on the destination for the communication, the process 800 may determine the best path for the communication to travel. The routing table in the computing device may be used to determine the best path for the communication. In some embodiments, the mesh network may be arranged in a daisy-chain arrangement with each gateway being connected to one or two other gateways, in which case only one path may be possible. In some embodiments, the mesh network may be arranged in a mesh arrangement with each gateway being connected to each of the other gateways, a mesh arrangement with each gateway being connected to three or more other gateways, or any other mesh arrangement. In such embodiments, multiple potential pathways may be available for the computing device to choose for transmitting the communication. As described above, the computing device may use a dynamic routing protocol to determine the best path to reach the destination. The dynamic routing protocol may include HWMP defined by IEEE 802.11s or any other appropriate transport protocol used by mesh networks. For example, the path may be determined using on-demand routing using RM-AODV, using pro-active routing, using tree-based routing, or any other appropriate routing technique or combination thereof.

At 808, the process 800 includes determining whether the second device is a node of the mesh network. Similar to step 804, the computing device may monitor incoming communications in order to determine whether the communications are received from a gateway node of the mesh network, a client device, or an external network (e.g., a wide area network). For example, the computing device may make the determination based on a MAC address, an IP address, a serial number, or other identifier of the second device. The identifier may be transmitted in a communication frame (e.g., data frame, control frame, management frame, or the like) along with the communication, or in a communication frame sent separately from the communication. The computing device may compare the identifier to a routing table, an index table, or other appropriate reference source to determine whether the second device is a node of the mesh network, similar to that described above.

At 808, the process 800 includes determining whether to transmit the communication to the second device on a second frequency band. The second frequency band is different from the first frequency band. The determination of whether to transmit the communication on the second frequency band depends on whether the first device or the second device is a node of the mesh network. In some examples, the process 800 may include transmitting the communication to the second device on the first frequency band when it is determined that the first device and the second device are both nodes of the mesh network. In other examples, the process 800 may include transmitting the communication to the device on the second frequency band when it is determined that the first device is not a node of the mesh network, in which cases the communication is transmitted on a channel of the second frequency band and the communication is transmitted using a second circuit configured to transmit and receive signals of the second frequency band. In other examples, the process 800 may include transmitting the communication to the second device on the second frequency band when it is determined that the first device is a node of the mesh network, when it is determined that the second device is not a node of the mesh network, and when the second device is connected to the mesh network using the second frequency band, in which cases the communication is transmitted on a channel of the second frequency band and the communication is transmitted using a second circuit configured to transmit and receive signals of the second frequency band. For example, as described above, the second device may select the channel or channels with which it will communication with the computing device. The computing device may be required to perform a band-switching operation if the frequency band on which it received the communication is a different band than the frequency band that the second device selected to communicate with the computing device. Other factors may be taken into account when determining whether to switch bands, as described above with respect to FIGS. 5 and 6. Devices that are not nodes of the mesh network may include a network device, an access device, a server of a wide area network, or any other device that does not make up the mesh network infrastructure.

The first circuit and the second circuit may each include a transceiver radio and other related circuitry for transmitting and receiving signals on channels of the corresponding frequency band. In some embodiments, the computing device may include a single circuit (the first circuit) for the first frequency band, and a single circuit (the second circuit) for the second frequency band. In some embodiments, the computing device includes multiple circuits for each of the first frequency band and the second frequency band. In such embodiments, the computing device may perform channel-switching operations, as described above.

While the description herein discusses specific examples of band-switching and channel-switching operations using WiFi, Bluetooth™, or Zigbee™ frequency bands, one of ordinary skill in the art will appreciate that band-switching and channel-switching operations can be performed on other frequency bands, including those that are currently in use or that may become available at a future date. For example, other frequencies for which band-switching and channel-switching operations may be used include tremendously low frequency bands (e.g., less than 3 Hz), extremely low frequency bands (e.g., 3 Hz-30 Hz), super low frequency bands (e.g., 30 Hz-300 Hz), ultra-low frequency bands (e.g., 300 Hz-3000 Hz), very low frequency bands (e.g., 3 KHz-30 KHz), low frequency bands (e.g., 30 KHz-300 KHz), medium frequency bands (e.g., 300 KHz-3000 KHz), high frequency bands (e.g., 3 MHz-30 MHz), very high frequency bands (e.g., 30 MHz-300 MHz), ultra high frequency bands (e.g., 300 MHz-3000 MHz), super high frequency bands (e.g., 3 GHz-30 GHz, including WiFi bands), extremely high frequency bands (e.g., 30 GHz-300 GHz), or terahertz or tremendously high frequency bands (e.g., 300 GHz-3000 GHz). Other examples of frequency bands that may be used include a 3.6 GHz frequency band (e.g., from 3.655 GHz to 3.695 GHz), a 4.9 GHz frequency band (e.g., from 4.940 GHz to 4.990 GHz), a 5.9 GHz frequency band (e.g., from 5.850 GHz to 5.925 GHz), a 868 MHz frequency band, a 915 MHz frequency band, a 2.4 GHz frequency band for Bluetooth™ or Zigbee™ technologies, or the like.

For example, the network device 402 illustrated in FIG. 4 may be connected to the range extending gateway 408 using a 915 MHz frequency band. The band-switching operation of the range extending gateway 408 may determine that the band that corresponds to the channel is the 915 MHz frequency band, and may determine another available frequency band on which to transmit the communication to the router gateway 406. For example, the band-switching operation may determine that the 868 MHz band was pre-established and is available for communication between the router gateway 406 and the range extending gateway 408. The range extending gateway 408 may then transmit the communication to the router gateway 406 on a channel of the 868 MHz band, for example, using a circuit configured to transmit and receive communications over the 868 MHz frequency band. One of ordinary skill in the art will appreciate that any combination of the above frequency bands and channels, or any other available frequency bands and channels, can be used in the band-switching and channel-switching operations described herein.

Figure 9:
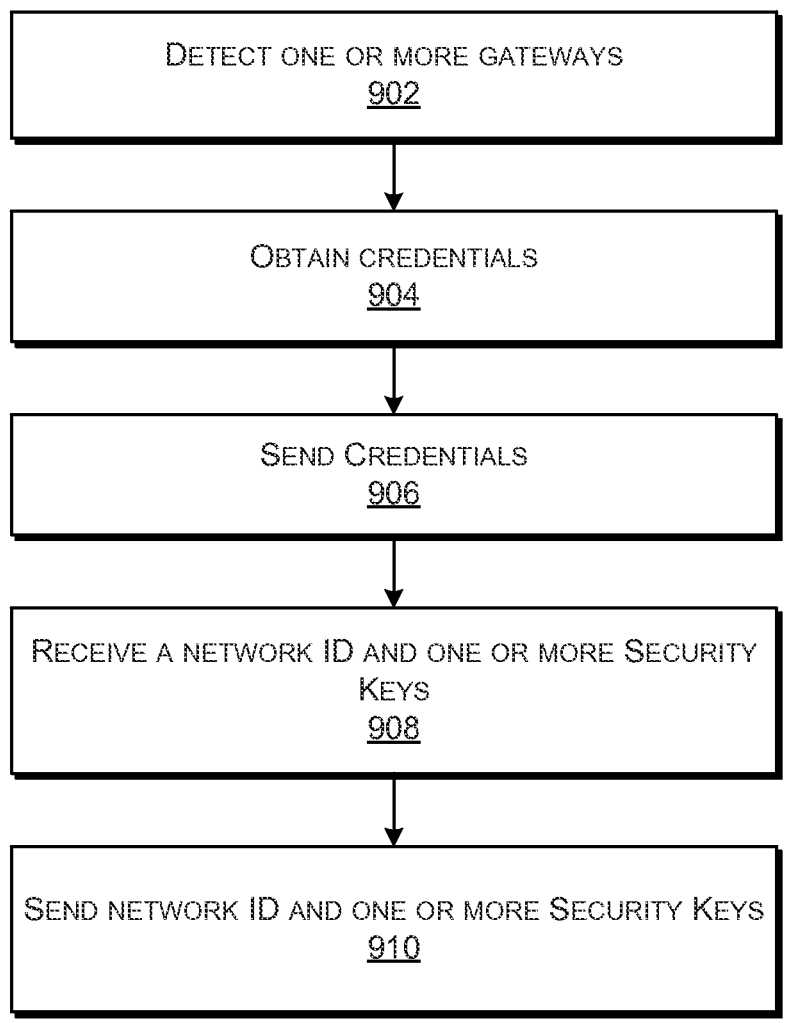
FIG. 9 is a flowchart illustrating an embodiment of a process for registering one or more network devices, in accordance with some embodiments.

As noted above in the description of FIG. 1, network devices, upon being powered on or reset, may be registered with a network (e.g., a cloud network) and associated with a logical network within a local area network. FIG. 9 illustrates an example of a process 900 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 9 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 902, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected.

The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 904, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 906. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 908, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 910, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like), as described above with respect to FIG. 9. For example, as described above, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

Figure 10:
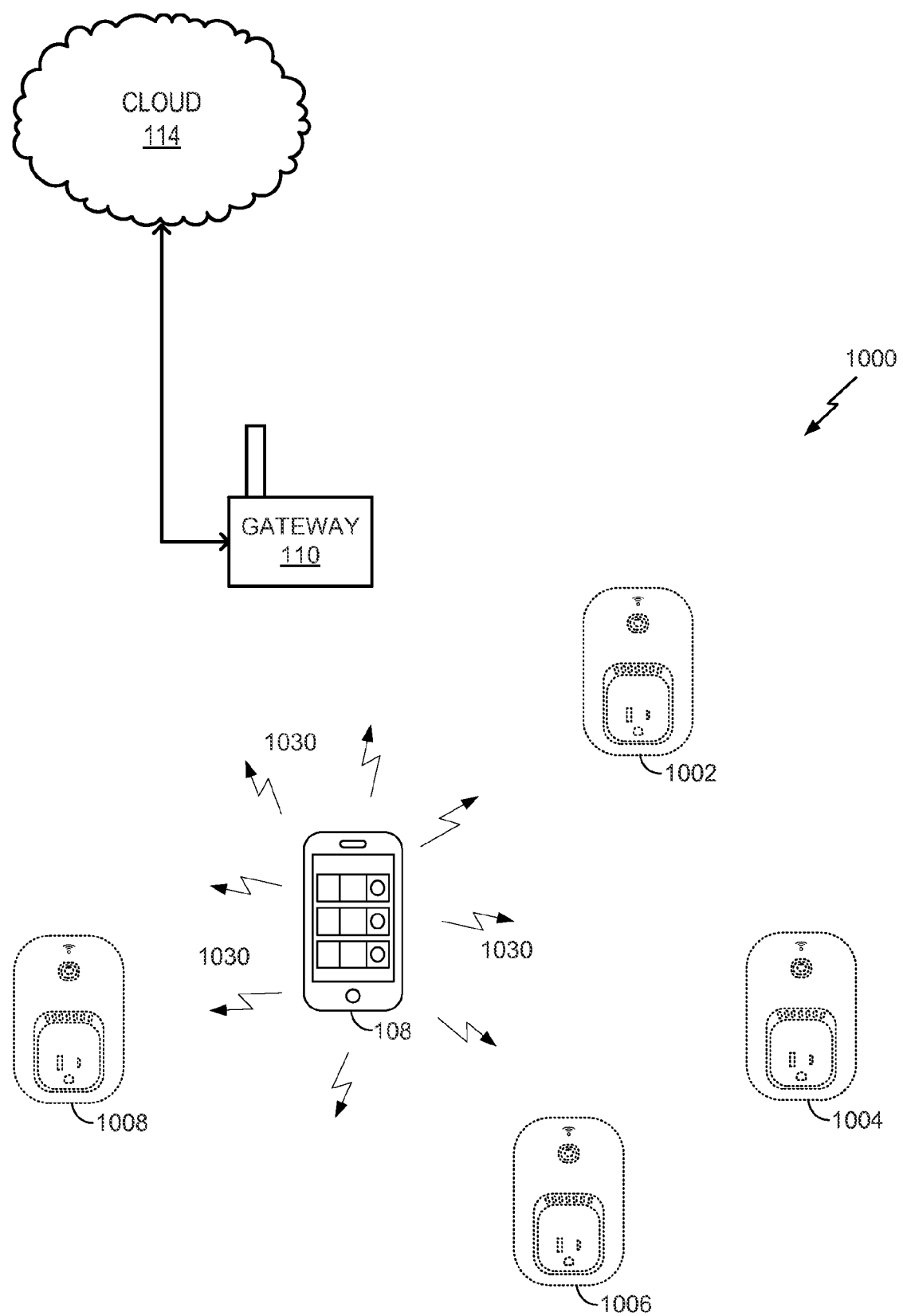
FIG. 10 is an illustration of an example of a network environment, in accordance with some embodiments.

FIG. 10 illustrates an example of a network 1000, according to embodiments of the present invention. Specifically, the network 1000 can be a wireless local area network enabling an access device to communicate with network devices to control adjustment of attributes related to operation of the network devices. Network 1000 includes network device 1002, network device 1004, network device 1006, and network device 1008. The network 1000 also includes access device 108. In other words, the network 1000 may be substantially similar to the network 100 except that access device 108 has been turned on near the network 1000, to which it is associated, or has entered an area to which the network 1000 can reach.

When access device 108 can enter the network 1000 as shown in FIG. 10, access device 108 may be authenticated based on the access device's authentication with the logical network or may otherwise commence communication with cloud network 114. Access device 108 may also communicate notification of its presence or other information directly to other network devices 1002-1008 within network 1000, as shown in FIG. 10 by communication paths 1030. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 1000, including network device 1002, network device 1004, network device 1006, and network device 1008, information/data regarding its status. Such status data may include the fact that it is present and turned on, or other status data/information. At any time that network devices 1002, 1004, 1006 and 1008 recognize that access device 108 is present at network 1000, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 1002-1008 and access device 108 may each receive communication from other network devices around the network 1000, including the status of each of those network devices, network devices 1002-1008 and/or access device 108 may be continuously scanning network 1000 (including, for example, running discovery algorithms) to determine whether any devices within the network have moved, turned on/off or otherwise added to or subtracted from the network 1000, or have otherwise changed statuses.

Since network devices 1002-1008 and access device 108 may each receive communication from other devices around network 1000, including the status of each of those devices, each network device within network 1000 may know the status of each other network device in the network 1000. For example, access device 108 or devices 1002-1008 may not be required to communicate with cloud network 114 in order to obtain one or more of such statuses. Since cloud network 114 is an external network and may be remote from network 1000, communication between network devices within the network 1000 and cloud 114 may take more time than communication between two devices within network 1000. For example, communication between devices within network 1000 may take anywhere from 1 millisecond to 100 milliseconds, while communication between a device within network 1000 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 1000 may choose to send and receive/retrieve statuses directly with other devices within the network 1000 instead of communicating such information via cloud network 114. When a network device receives status data from another network device on the device's local area network 1000, it may store that status data so that it may retrieve and use that status data at a later time.

Figure 11:
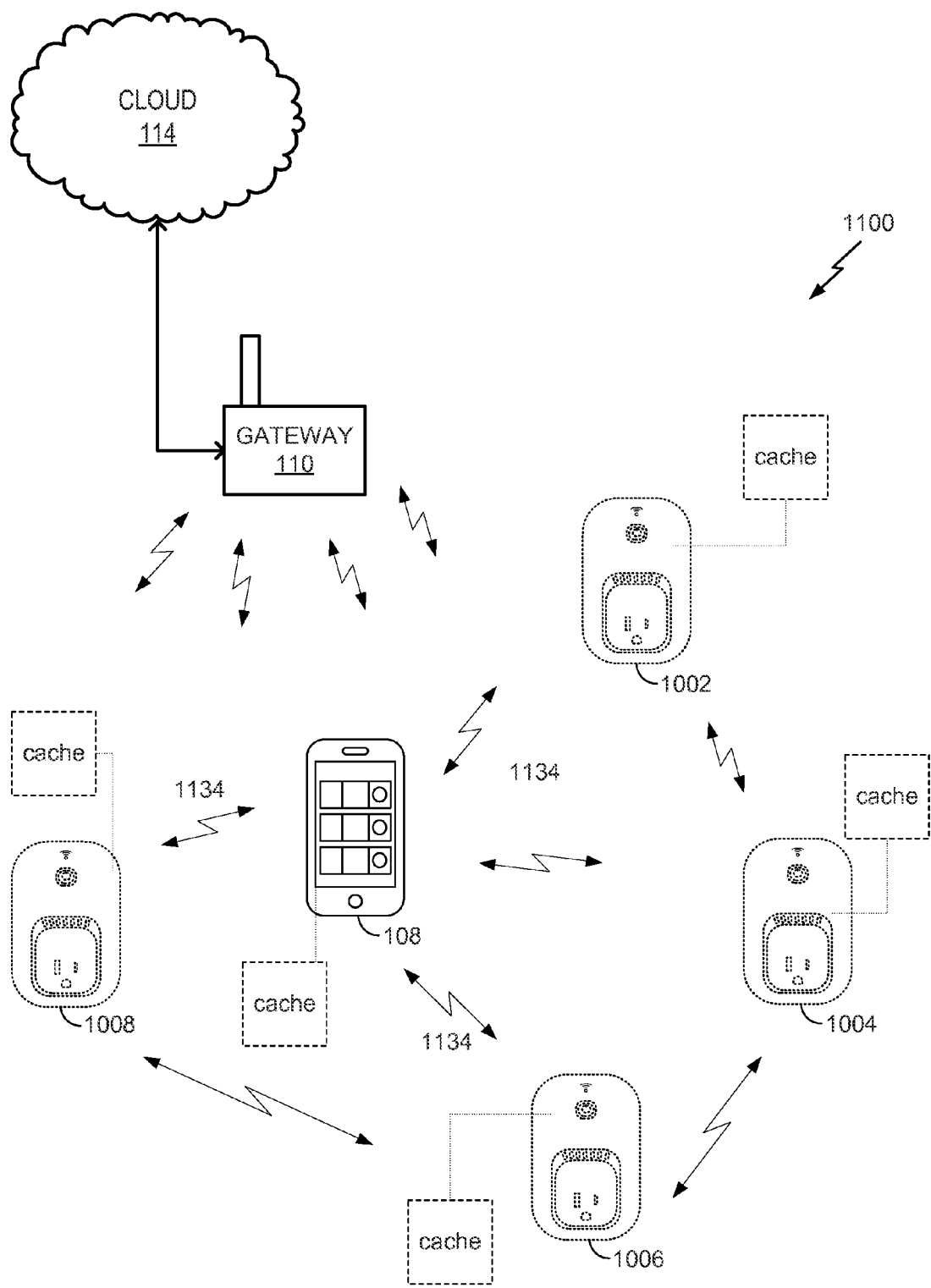
FIG. 11 is an illustration of an example of a network environment, in accordance with some embodiments.

FIG. 11 illustrates an example of a network 1100, according to embodiments of the present invention. The local area network 1100 may include network device 1002, network device 1004, network device 1006, network device 1008, and access device 108. FIG. 11 also illustrates that one or more network devices 1002-1008 and/or access device 108 may include a storage device, such as a cache, for storing data, including data regarding its own status and data regarding statuses received from the other devices within local area network 1100. For example, access device 108 may, after being powered up, broadcast/send its status to network device 1008 via communication 1134. Network device 1008 may store the status data received from access device 108 until the next time access device 108 updates its status by sending new/updated status data to network device 1008. Cache may be used for storage within network devices 1002-1008 and/or access devices within the local area network 1100 so that each of the devices may be able to quickly retrieve the data it needs from storage. An application operating on the access device 108 can access the cache to obtain information to display the visual interface for each network device 1002-1008 registered within the network 1100. Although a caching device may be used to store such data within the network and/or access devices within the local area network 1100, other types of storage may be used.

The cache can contain a known interface list including interface information for different, known types of devices. The known list can include a record for each network device known by the access device 108 to exist on the network 1100. When an application is run on the access device 108, the access device 108 can access the known interfaces in the cache to present the display of access device 108. The display can present one or more visual interfaces, each corresponding to a network device known to exist on the network 1100. Each visual interface can be generated based on a visual interface module corresponding to each device on the network 1100. In an example, the display can include a visual interface (e.g., a module tile) for each device in the network 1100 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 1100. For example, the status display can include a speed of a fan (e.g., a fan speed of 56 in a range of values between 0 and 100) of the network device 1002 (e.g., a fan), a value of sensitivity of a sensor (e.g., a value of 34 in a range of values 0-100) for the network device 1004 (e.g., a motion sensor), a value of brightness (e.g., 65 percent brightness) for the network device 1006 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 1100 and can use that information to update its own cache, update the status display, and/or pass the information to the cloud network 114 and/or the gateway 110 for trouble shooting and/or storage.

Even though each network device may know and store (e.g. in cache) the state of each other network device within local area network 1100, a network device may not know when another network device changes status (e.g. turns/powers off). However, network devices and/or access devices within local area network 1100 may broadcast/send any updates in its status to other devices on the network. For example, if network device 1002 changes status, it may send status data to the other network devices, such as network devices 1004, 1006 and 1008 and to access device 108. However, network device 1002 may not know which devices to update since the other devices may change statuses periodically (e.g. turn off).

Therefore, a network or access device may subscribe to another network or access device within local area network 1100. For example, network devices 1004, 1006 and 1008 and access device 108 may subscribe to status data notifications/updates from network device 1002. Such a subscription may be registered for upon initial connection with network device 1002 when network device 1002 first enters local area network 1100 or at any other time after network device 1002 has been associated with local area network 1100. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 9. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 1002 may store a list of network devices 1004, 1006 and 1008 and access device 108 after those devices subscribe to network device 1002. Then, when network device 1002 undergoes a change in status, network device 1002 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 1100, each contain continuously updated statuses of each other device on the network and obtain those statuses and updates through direct communication without necessary use of the cloud.

Figure 12:
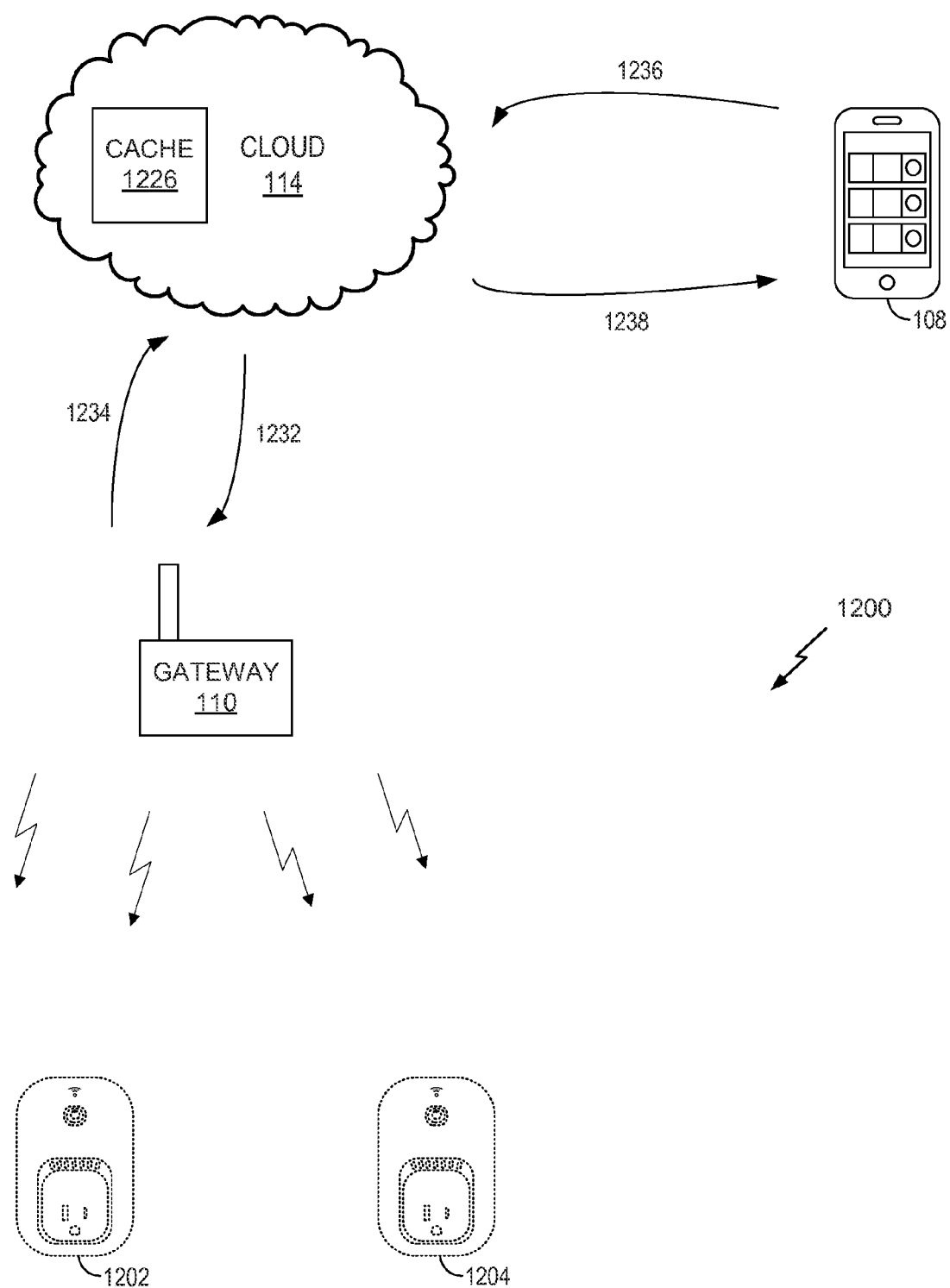
FIG. 12 is an illustration of an example of a network environment, in accordance with some embodiments.

FIG. 12 illustrates an access device 108 that is located remotely from network 1200 (e.g. local area network), according to embodiments of the present invention. Local area network 1200 includes gateway 110 and network devices 1202 and 1204 (which may be, for example, the same as any of network devices 1002-1008 in FIGS. 10 and 11), as shown in FIG. 12. However, network 1200 may also include a variety of other network devices and one or more access devices directly connected to network 1200. Gateway 110 is connected to cloud network 114, and allows network devices 1202 and 1204 to connect to cloud 114, the internet, or other external networks via gateway 110. In some embodiments, the network devices 1202 and 1204 may include home automation devices that allow a user to access, control, and/or configure various home appliances located within the user's home, such as a television, radio, light, microwave, iron, and/or the like.

Access device 108 is not directly connected to network 1200. Instead, access device 108 is external to network 1200 and may connect to cloud network 114 and to network 1200 via cloud network 114. As noted, network devices 1202 and 1204 may change status on a periodic basis. In some embodiments, even when external to and not directly connected to network 1200, an access device may request to check the status of the devices on the network. When access device 108 seeks to check the status of any device on the network, the access device 108 may transmit/send a communication 1236 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 1238 of such status data to the access device 108. For example, after network devices 1202 and 1204 are turned on, authenticated and are a part of network 1200, network devices 1202 and 1204 may communicate their statuses to cloud network 114. Furthermore, any time the status of network devices 1202 and 1204 changes, the device that incurred a status change may push/send information (e.g. an indication) of that status change to cloud network 114. Cloud network 114 may store, in cache 1226 or otherwise, the statuses (which may be time stamped in metadata or otherwise) of network devices 1202 and 1204. Therefore, when access device 108 requests from cloud network 114 the statuses of devices on network 1200, cloud 114 may send its most recently stored/updated statuses to access device 108.

To obtain the most updated status data of devices within network 1200, cloud 114 may, upon receiving a request for status data related to network devices 1202 and 1204, transmit/send a communication 1232 (e.g. request, query, etc.) for such status data to network devices 1202 and 1204 via gateway 110. Once network devices 1202 and 1204 receive this request, network devices 1202 and 1204 may send a communication 1234 (e.g. updated status data) to cloud 114 to replace the previously stored/cached statuses in cache 1226. Upon receipt of updated status data 1234 from network 1200, cloud 114 may send a communication 1238 of such status data to the access device 108.

However, the process of cloud network 114 requesting updated statuses from network devices 1202 and 1204 within network 1200 may cause latency within the system. More specifically, the time required for cloud network 114 to request updated statuses from network devices 1202 and 1204 and to in turn receive updated statuses from network devices 1202 and 1204 may be substantially greater than the time required for cloud network 114 to send its currently stored statuses (without being updated) for network devices 1202 and 1204 to access device 108. For example, of the total time required for access device 108 to receive updated statuses from cloud network 114, 80% or more of that total time may include cloud network 114 requesting updated statuses from network devices 1202 and 1204. On the other hand, of the total time required for access device 108 to receive updated statuses from cloud network 114, 20% or more of that total time may include the status data being transmitted from cloud network 114 to access device 108.

Since a majority of the process required for access device 108 to request and receive status data for network devices 1202 and 1204 is the transmission of data between cloud 114 and network devices 1202 and 1204, the access device 108 and cloud network 114 may maximize efficiency by minimizing the effect of the transmission of data between cloud 114 and network devices 1202 and 1204 on the whole process/system.

Figure 13:
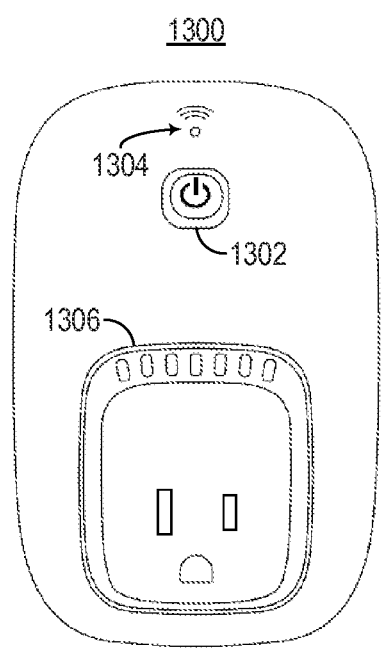
FIG. 13 is an illustration of an example of a front view of a network device, in accordance with an embodiment.
Figure 14:
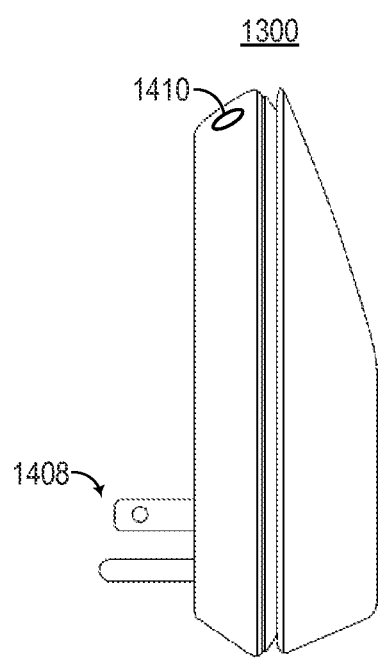
FIG. 14 is an illustration of an example of a side view of a network device, in accordance with an embodiment.

FIG. 13 illustrates an example of a front view of a network device 1300. FIG. 14 illustrates an example of a side view of the network device 1300. The network device 1300 may include any of the network devices 102, 104, or 106 described herein. In some embodiments, the network device 1300 may be a home automation network device. For example, the network device 1300 may include a home automation switch that may be coupled with a home appliance. A user may wirelessly access the network device 1300 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1300 may include a WiFi enabled switch that connects home appliances and other electronic devices to a compatible 802.11b/g/n/ac WiFi network. The network device 1300 may thus allow users to locally or remotely turn devices on or off from anywhere, program customized notifications, and/or change device status. The network device 1300 may further allow a user to create custom schedules or have devices respond to sunrise or sunset.

The network device 1300 includes an power switch 1302 that may be depressed in order to turn the network device 1300 on and off. In some embodiments, a light source may be integrated with or located behind the power switch. For example, a light-emitting diode (LED) may be located on a circuit board under the power button 1302. The light source may be illuminated when the network device 1300 is powered on, and may not be illuminated when the network device 1300 is powered off.

The network device 1300 further includes a communications signal indicator 1304. The signal indicator 1304 may indicate whether the network device 1300 has access to a communications signal, such as a WiFi signal. For example, the signal indicator 1304 may include a light source (e.g., a LED) that illuminates when the network device 1300 is connected to a communications signal. The light source may depict different colors or other characteristics (e.g., flashing, dimming, or the like) to indicate different levels of signal strength or mode of operation.

The network device 1300 includes a restore button 1410. The restore button 1410 may allow a user to reset the network device 1300 to factory default settings. For example, upon being depressed, the restore button 1410 may cause all software on the device to be reset to the settings that the network device 1300 included when purchased from the manufacturer.

The network device 1300 further includes a plug 1408 and an outlet 1306. The plug 1408 allows the network device 1300 to be plugged into a wall socket, such as a socket providing 120V, 220V, or the like. In turn, an appliance may be plugged into the outlet 1306. Once the network device 1300 is registered according to the techniques described above, an appliance plugged into the socket 1306 may be controlled by a user using an access device (e.g., access device 108).

Figure 15:
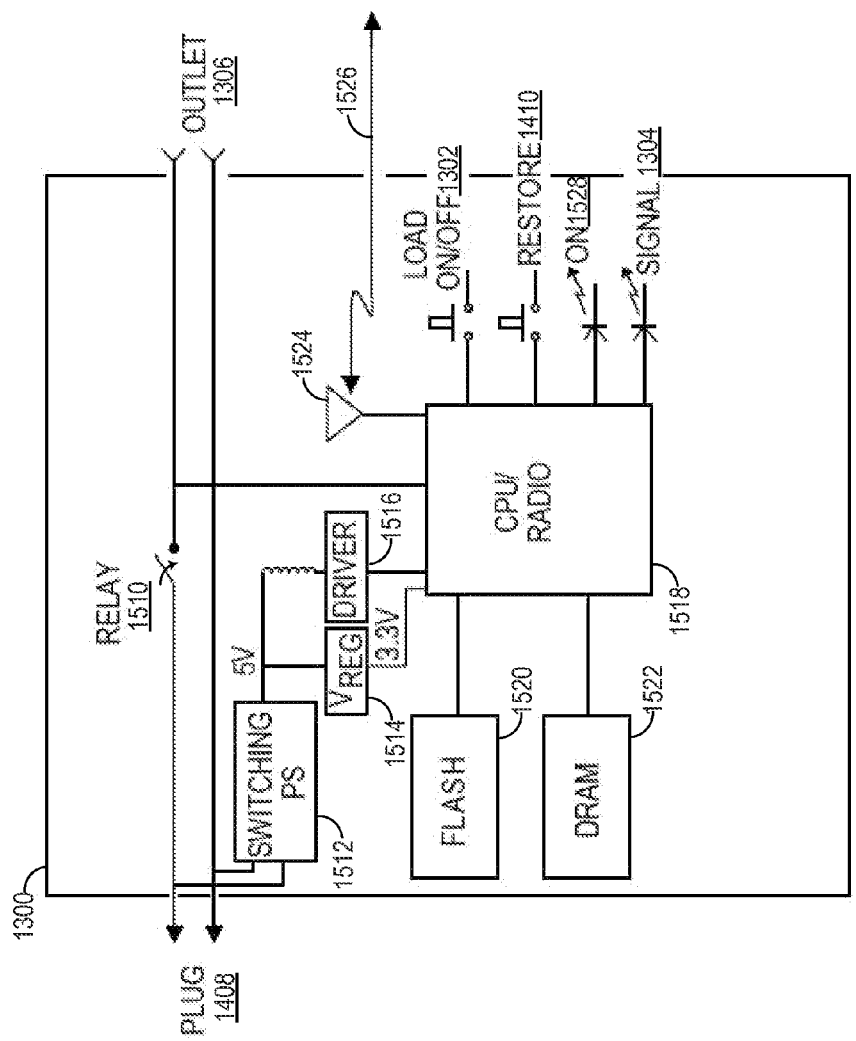
FIG. 15 is an example of a block diagram of a network device, in accordance with an embodiment.

FIG. 15 is an example of a block diagram of the network device 1300 depicting different hardware and/or software components of the network device 1300. As described above with respect to FIGS. 13 and 14, the network device 1300 includes the outlet 1306, the plug 1408, the power button 1302, the restore button 1410, and the communications signal indicator 1304. The network device 1300 also includes light source 1528 associated with the power button 1302. As previously described, the light source 1528 may be illuminated when the network device 1300 is powered on.

The network device 1300 further includes a relay 1510. The relay 1510 is a switch that controls whether power is relayed from the plug 1408 to the outlet 1306. The relay 1510 may be controlled either manually using the power button 1302 or remotely using wireless communication signals. For example, when the power button 1302 is in an ON position, the relay 1510 may be closed so that power is relayed from the plug 1408 to the outlet 1306. When the power button 1302 is in an OFF position, the relay 1510 may be opened so that current is unable to flow from the plug 1408 to the outlet 1306. As another example, an application or program running on an access device may transmit a signal that causes the relay 1510 to be opened or closed. For instance, an access application may display a graphical interface on the access device that includes a power button. The user may tap or otherwise select the power button, and the access application may send a communication signal (e.g., over a WiFi network) to the network device 1300 instructing the network device 1300 to open or close the relay 1510.

The network device 1300 further includes flash memory 1520 and dynamic random access memory (DRAM) 1522. The flash memory 1520 may be used to store instructions or code relating to an operating system, one or more applications, and any firmware. The flash memory 1520 may include nonvolatile memory so that any firmware or other program can be can updated. In the event the network device 1300 loses power, information stored in the flash memory 1520 may be retained. The DRAM 1522 may store various other types of information needed to run the network device 1300, such as all runtime instructions or code.

The network device 1300 further includes a CPU/Radio 1518. The CPU/Radio 1518 controls the operations of the network device 1300. For example, the CPU/Radio 1518 may execute various applications or programs stored in the flash memory 1520 and/or the dynamic random access memory (DRAM) 1522. The CPU/Radio 1518 may also receive input from the various hardware and software components, interpret the input, and perform one or more functions in response to the input. As one example, the CPU/Radio 1518 may determine whether the power button 1302 has been pressed, and determines whether the relay 1510 needs to be opened or closed. The CPU/Radio 1518 may further perform all communications functions in order to allow the network device 1300 to communicate with other network devices, one or more gateways, a cloud network, and/or one or more access devices. While the CPU and radio of the network device 1300 are shown to be combined in the CPU/Radio 1518, one of ordinary skill in the art will appreciate that, in some embodiments, the CPU and radio may be separately located within the network device 1300. For example, CPU circuitry may be situated at a separate location on a circuit board from the location of radio circuitry, the CPU circuitry may be located on a different circuit board from the radio circuitry, or the like. Further, the network device 1300 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 1300 does not include a cellular network transceiver radio or interface, and thus may not be configured to directly communicate with a cellular network. In some embodiments, the network device 1300 may include a cellular network transceiver radio, and may be configured to communicate with a cellular network using the cellular network transceiver radio.

The network device 1300 may communicate with other devices and/or networks via antenna 1524. For example, antenna 1524 may include a 2.4 GHz antenna, a 5 GHz antenna, or the like, that can transmit and receive WiFi communications signals. The network device 1300 may include other types of antennas that can communicate Bluetooth® signals, Zigbee® signals, Ultra-Wideband (UWB) signals, WiFi-Direct signals, BLE signals, and/or the like. In some embodiments, the antenna 1524 may be configured to communicate different types of signals, such as the WiFi signals, Bluetooth® signals, Zigbee® signals, UWB signals, WiFi-Direct signals, BLE signals, and/or the like. In some embodiments, the network device 1300 may include multiple antennas for communicating the different types of communication signals. As one example, the network device 1300 may include both a 2.4 GHz antenna and a 5 GHz antenna.

The network device 1300 further includes a driver 1516, a switching power supply 1512, and a voltage regulator 1514. The driver 1516 may include instructions or code that can be used to translate control signals or commands received from applications running on the DRAM 1522 to commands that the various hardware components in the network device 1300 can understand. In some embodiments, the driver 1516 may include an ambient application running on the DRAM 1522. The switching power supply 1512 may be used to transfer power from the outlet in which the plug 1408 is connected to the various loads of the network device 1300 (e.g., CPU/Radio 1518). The switching power supply 1512 may efficiently convert the voltage and current characteristics of the electrical power to a level that is appropriate for the components of the network device 1300. For example, the switching power supply 1512 may perform AC-DC conversion. In some embodiments, the switching power supply 1512 may be used to control the power that is relayed from the plug 1408 to the outlet 1306. The voltage regulator 1514 may be used to convert the voltage output from the switching power supply 1512 to a lower voltage usable by the CPU/Radio 1518. For example, the voltage regulator 1514 may regulate the DC voltage from 5V to 3.3V.

In various embodiments, functions may be stored as one or more computer-program products, such as instructions or code, in a non-transitory machine-readable storage medium, such as the flash memory 1520 and/or the DRAM 1522. The network device 1300 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 9, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 9. The memory, such as the flash memory 1520 and/or the DRAM 1522, may be a processor-readable memory and/or a computer-readable memory that stores software code (programming code, instructions, etc.) configured to cause a processor(s) within the CPU/Radio 1518 to perform the functions described. In other embodiments, one or more of the functions described may be performed in hardware.

A set of these instructions and/or code might be stored on a non-transitory machine-readable storage medium, such as the flash memory 1520 and/or the DRAM 1522. In some cases, the storage medium might be incorporated within a computer system, such as the CPU/Radio 1518. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1300 and/or might take the form of source and/or installable code, which, upon compilation and/or installation on the network device 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1300 may have other components than those depicted in FIGS. 13-15. Further, the embodiment shown in the figures are only one example of a network device that may incorporate an embodiment of the invention. In some other embodiments, network device 1300 may have more or fewer components than shown in the figure, may combine two or more components, or may have a different configuration or arrangement of components.

Figure 16:
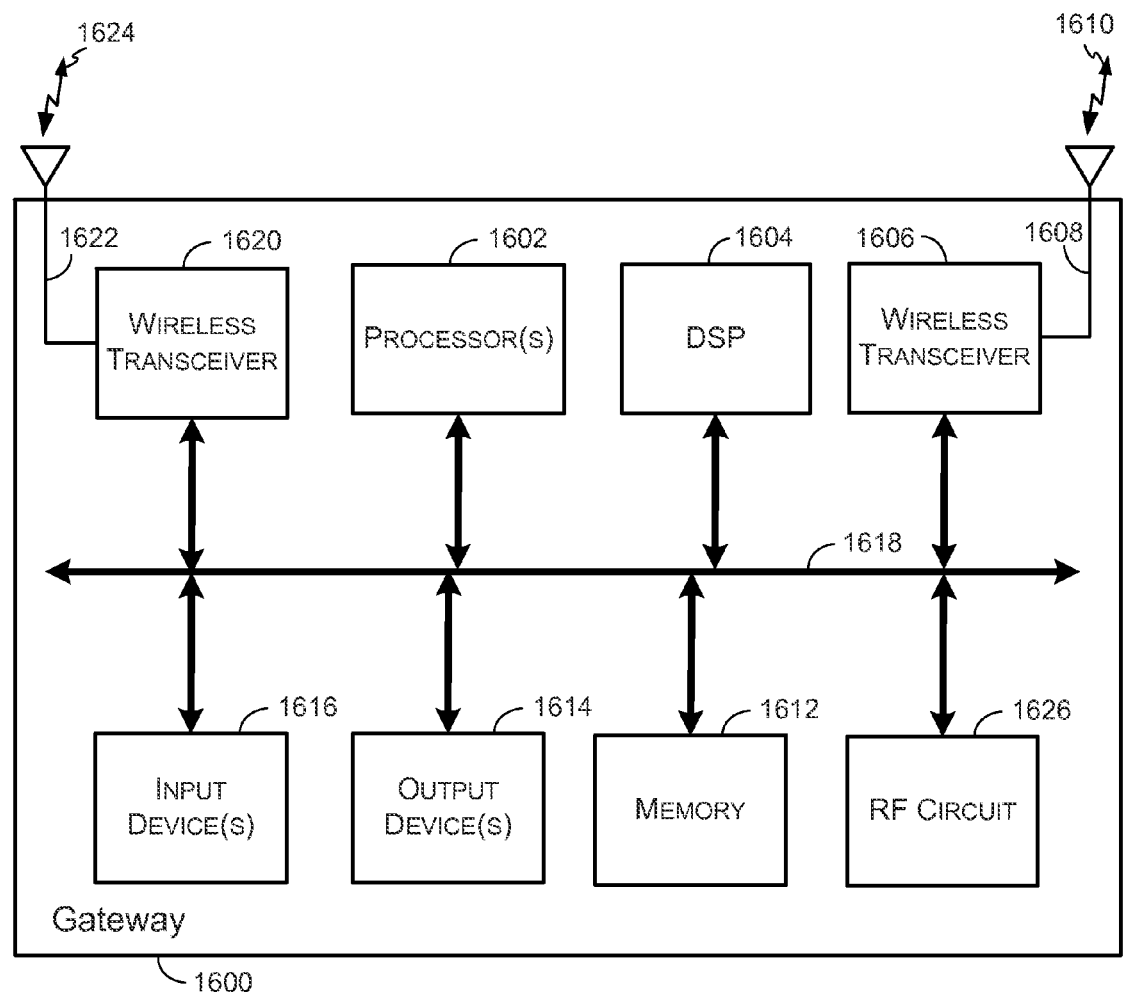
FIG. 16 is a block diagram illustrating an example of a gateway, in accordance with some embodiments.

FIG. 16 illustrates an example of a gateway 1600. The gateway 1600 may include a range extending device, a router, an access point, a modem, and/or any other device that provides network access among one or more computing devices and/or external networks. For example, the gateway 1600 may include a router gateway with access point and router functionality, and may further include an Ethernet switch and/or a modem. As another example, the gateway 1600 may include a range extending gateway that may be used to improve signal range and strength within a network by taking an existing signal from another gateway (e.g., a router gateway, an access point, or the like) and rebroadcasting the signal to create a second logical network.

The gateway 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation one or more buttons, a keyboard, a keypad, a touch sensitive screen, a touch pad, and/or the like; and one or more output devices 1614, which can include, without limitation, a display, light or sound indicators, and/or the like.

The gateway 1600 may include one or more wireless transceivers 1606 and 1620 connected to the bus 1618. The wireless transceiver 1606 may be operable to receive wireless signals (e.g., a wireless signal 1610) via an antenna 1608. The wireless transceivers 1620 may be operable to receive wireless signals (e.g., a wireless signal 1614) via an antenna 1622. The wireless transceivers 1606 and 1620 may each include a WiFi transceiver radio designed to transmit and receive signals using frequencies of a specific frequency band, which may be referred to herein as "WiFi circuits." For example, wireless transceiver 1606 may include a 2.4 GHz WiFi circuit, and wireless transceiver 1620 may include a 5 GHz WiFi circuit. Accordingly, the gateway 1600 may include a single WiFi circuit for a first WiFi frequency band, and a single WiFi circuit for a second WiFi frequency band. In some embodiments, the gateway 1600 may include multiple wireless transceivers (not shown) for each available frequency band. The antennas 1608 and 1622 may include multiple band antennas that can transmit and/or receive signals over different frequency bands.

The gateway 1600 may further include radio frequency (RF) circuit 1626. In some embodiments, the wireless transceivers 1606 and 1620 may be integrated with or coupled to the RF circuit 1626 so that the RF circuit 1626 includes the wireless transceivers 1606 and 1620. In some embodiments, the wireless transceivers 1606 and 1620 and the RF circuit 1626 are separate components. The RF circuit 1626 may include a RF amplifier that may amplify signals received over antennas 1608 and 1622. The RF circuit 1626 may also include a power controller that may be used to adjust signal amplification by the RF amplifier. The power controller may be implemented using hardware, firmware, software, or any combination thereof.

The wireless signals 1610 and 1624 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 1606 and 1620 may be configured to receive various radio frequency (RF) signals (e.g., signals 1610 and 1624) via antennas 1608 and 1624, respectively, from one or more other gateways, access devices, network devices, cloud networks, and/or the like. Gateway 1600 may also be configured to decode and/or decrypt, via the DSP 1604 and/or processor(s) 1602, various signals received from one or more gateways, network devices, cloud networks, and/or the like.

The gateway 1600 may include a power supply (not shown) that can power the various components of the gateway 1600. The power supply may include a switch-mode power supply, a linear power supply, a push-pull power supply, or any other suitable type of power supply. In some embodiments, the gateway 1600 may include multiple power supplies. For example, a switch-mode power supply may be used to condition input power, and a linear power supply may be used to power the RF circuit 1626. The power supply may be configured to operate over various ranges of appropriate input voltages.

The gateway 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1612, such as RAM, ROM, FLASH, or disc drive, and executed by processor(s) 1602 or DSP 1604. The gateway 1600 can also comprise software elements (e.g., located within the memory 1612), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 7 and/or 8, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 7 and/or 8. The memory 1612 may be a non-transitory machine-readable storage medium, processor-readable memory, and/or a computer-readable memory that stores the one or more computer-program products configured to cause the processor(s) 1602 to perform the functions described. In other embodiments, one or more of the functions described may be performed in hardware.

A set of these instructions and/or code might be stored on a non-transitory machine-readable storage medium, such as the memory 1612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1600 and/or might take the form of source and/or installable code, which, upon compilation and/or installation on the gateway 1600 (e.g., using any of a variety of generally available compilers, installation programs, compression/decompression utilities, etc.) then takes the form of executable code.

Figure 17:
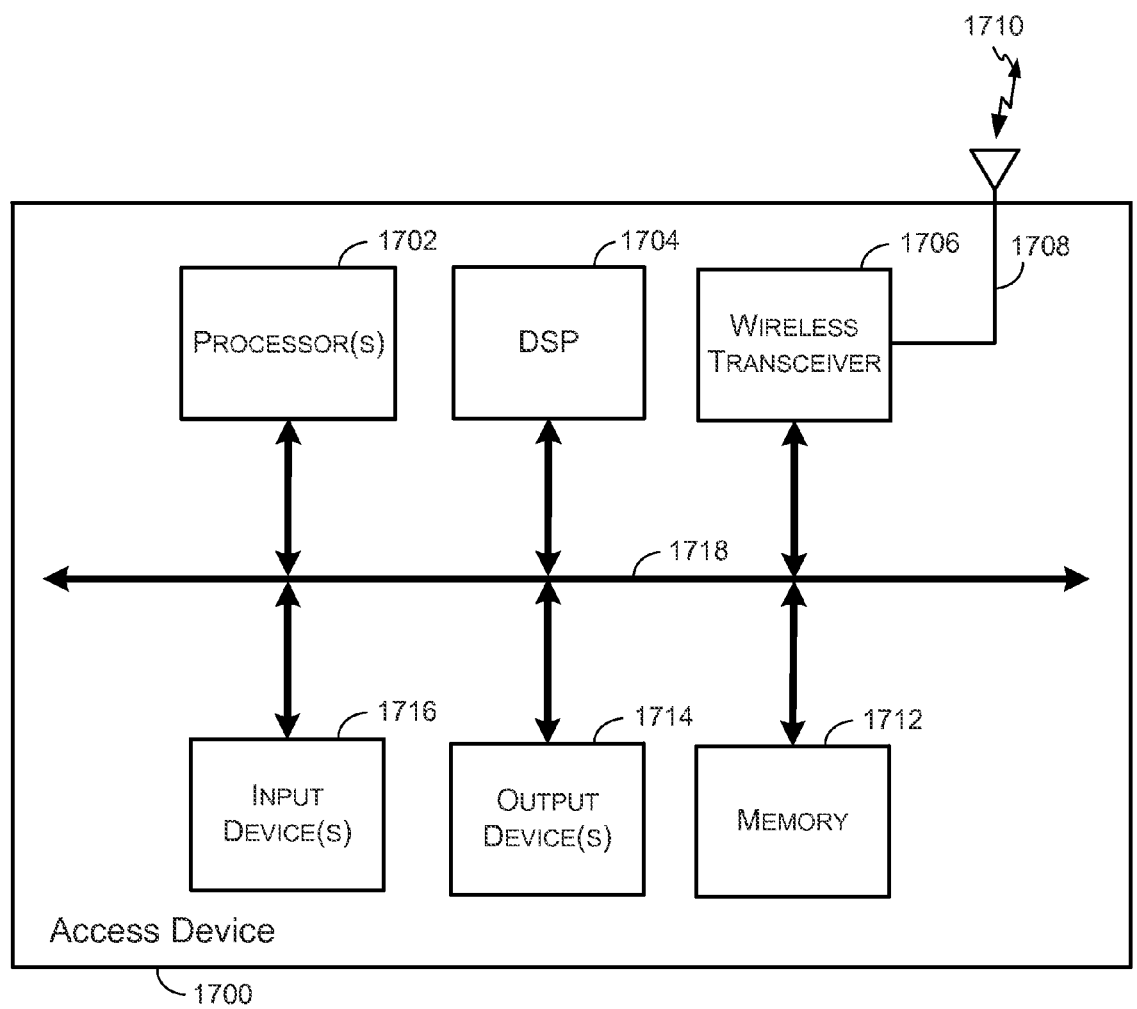
FIG. 17 is a block diagram illustrating an example of an access device, in accordance with some embodiments.

FIG. 17 illustrates an example of an access device 1700. The access device 1700 may include any human-to-machine interface with network connection capability that allows access to a network. For example, the access device 1700 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1700 includes hardware elements that can be electrically coupled via a bus 1718 (or may otherwise be in communication, as appropriate). In one embodiment, the bus 1718 can be used for the processor(s) 1702 to communicate between cores and/or with the memory 1712. The hardware elements may include one or more processors 1702, including without limitation one or more general-purpose processors and/or one or more special-purpose processors (such as digital signal processing chips, graphics acceleration processors, and/or the like); one or more input devices 1716, which can include without limitation a camera, a mouse, a keyboard, a touch sensitive screen, a touch pad, a keypad, and/or the like; and one or more output devices 1714, which can include, without limitation, a display, a printer, and/or the like.

The access device 1700 may include one or more wireless transceivers 1706 connected to the bus 1718. The wireless transceiver 1706 may be operable to receive wireless signals via antenna 1708 (e.g., signal 1710). The wireless signal 1710 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1706 may be configured to receive various radio frequency (RF) signals (e.g., signal 1710) via antenna 1708 from one or more gateways, network devices, other access devices, cloud networks, and/or the like. Access device 1700 may also be configured to decode and/or decrypt, via the DSP 1704 and/or processor(s) 1702, various signals received from one or more gateways, network devices, other access devices, cloud networks, and/or the like.

The access device 1700 may further include (and/or be in communication with) one or more non-transitory machine-readable storage mediums or storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1712, such as RAM, ROM, FLASH, or disc drive, and executed by processor(s) 1702 or DSP 1704. The access device 1700 can also comprise software elements (e.g., located within the memory 1712), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 7 and/or 8, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 7 and/or 8. The memory 1712 may be a non-transitory machine-readable storage medium, processor-readable memory, and/or a computer-readable memory that stores the one or more computer-program products configured to cause the processor(s) 1702 to perform the functions described. In other embodiments, one or more of the functions described may be performed in hardware.

A set of these instructions and/or code might be stored on a non-transitory machine-readable storage medium, such as the memory 1712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the access device 1700 and/or might take the form of source and/or installable code, which, upon compilation and/or installation on the access device 1700 (e.g., using any of a variety of generally available compilers, installation programs, compression/decompression utilities, etc.) then takes the form of executable code.

Figure 18:
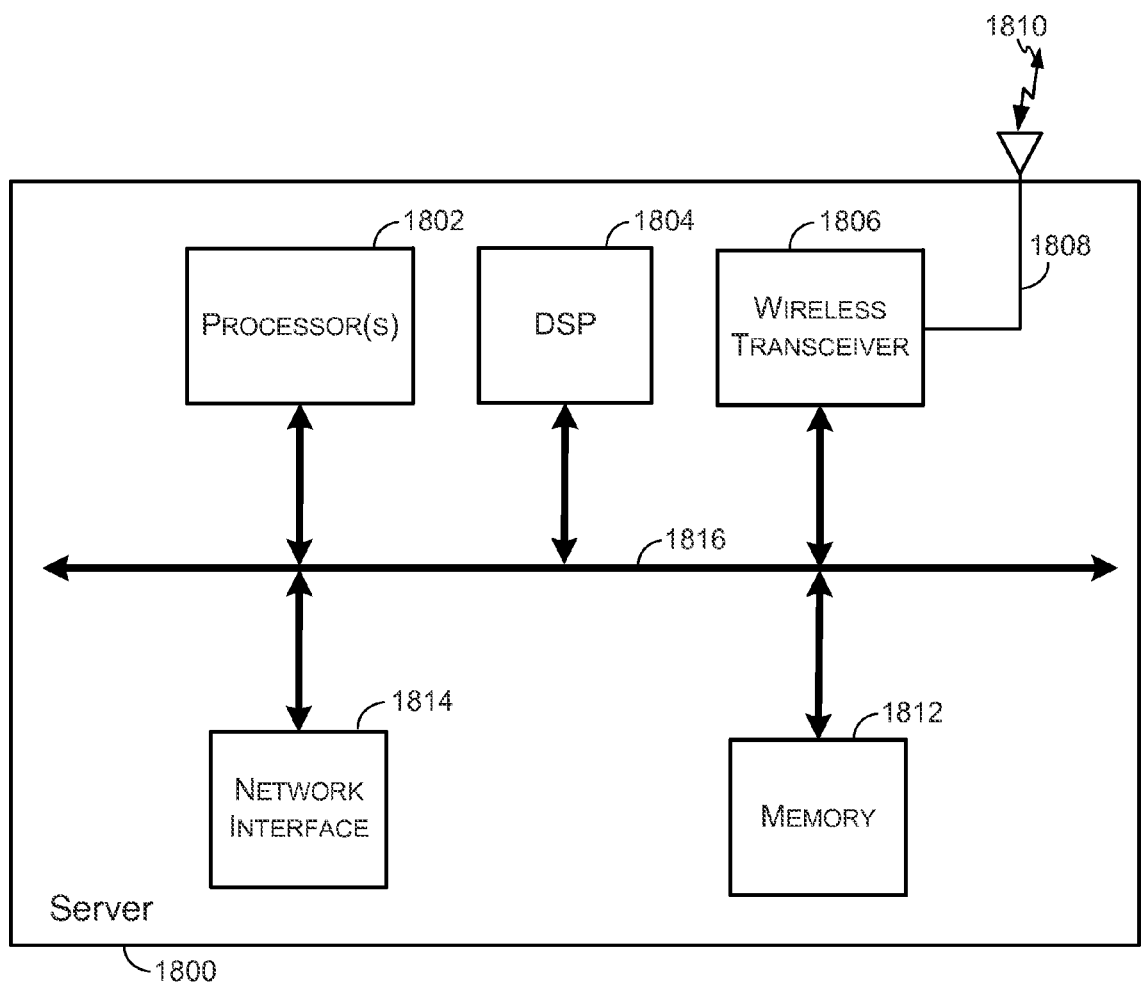
FIG. 18 is a block diagram illustrating an example of a server, in accordance with some embodiments.

FIG. 18 illustrates an example of a server 1800. The server 1800 includes hardware elements that can be electrically coupled via a bus 1816 (or may otherwise be in communication, as appropriate). In one embodiment, the bus 1816 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like), memory 1812, DSP 1804, a wireless transceiver 1806, a bus 1816, and antenna 1808. Furthermore, in addition to the wireless transceiver 1806, server 1800 can further include a network interface 1814 to communicate with a network (e.g., a local area network, a network of a preferred carrier, Internet, etc.).

The server 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1812. The server 1800 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement various methods and/or configure various systems. The memory 1812 may be a non-transitory machine-readable storage medium, processor-readable memory, and/or a computer-readable memory that stores the one or more computer-program products configured to cause the processor(s) 1802 to perform the various functions. In other embodiments, one or more functions may be performed in hardware.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computing device, comprising:
   one or more processors;
   a first WiFi circuit for receiving a communication at the computing device, wherein the computing device is a node of a mesh network, wherein the communication includes a source address of an origin device of the communication and a destination address of a destination device for the communication, and wherein the communication is received on a first WiFi frequency band;

a non-transitory machine-readable storage medium containing instructions which when executed on the one or more processors, cause the one or more processors to perform operations including:

determining whether the origin device is a node of the mesh network based on the source address;

determining whether to perform a dynamic band-switching operation, wherein a band-switching operation is always performed when the origin device is not a node of the mesh network; and performing the dynamic band-switching operation when the origin device is not a node of the mesh network, wherein performing the dynamic band-switching operation includes switching from the first WiFi frequency band to a second WiFi frequency band;

a transmitter for transmitting the communication using the second WiFi frequency band, wherein the communication is transmitted to a second node of the mesh network, wherein a second dynamic band-switching operation is always performed by the second node when it is determined that the communication is to be transmitted from the second node to a destination device that is not a node of the mesh network, wherein the determination that the destination device is not a node of the mesh network is based on the destination address, and wherein the second dynamic band-switching operation includes switching from the second WiFi frequency band to the first WiFi frequency band.

2. The computing device of claim 1, wherein the first WiFi circuit is configured to transmit a communication received from a third device to a fourth device on the first WiFi frequency band when it is determined that the third device and the fourth device are nodes of the mesh network.

3. The computing device of claim 2, wherein the third device or the fourth device includes a wireless range extending device.

4. The computing device of claim 1, further comprising a second WiFi circuit, wherein the second WiFi circuit includes the transmitter for transmitting the communication to the second node of the mesh network on the second WiFi frequency band, and wherein the communication is transmitted on a channel of the second WiFi frequency band.

5. The computing device of claim 1, wherein the origin device or the destination device includes a network device, an access device, or a server of a wide area network.

6. The computing device of claim 4, wherein when the first WiFi frequency band includes a 2.4 gigahertz frequency band, the second WiFi frequency band includes a 5 gigahertz frequency band.

7. The computing device of claim 4, wherein when the first WiFi frequency band includes a 5 gigahertz frequency band, the second WiFi frequency band includes a 2.4 gigahertz frequency band.

8. The computing device of claim 1, wherein the computing device includes a wireless range extending device.

9. A computer-implemented method, comprising:

receiving, on a computing device, a communication, wherein the computing device is a node of a mesh network, wherein the communication includes a source address of an origin device of the communication and a destination address of a destination device for the communication, and wherein the communication is received on a first WiFi frequency band;

determining whether the origin device is a node of the mesh network based on the source address;

determining whether to perform a dynamic band-switching operation, wherein a band-switching operation is always performed when the origin device is not a node of the mesh network;

performing a dynamic band-switching operation when the origin device is not a node of the mesh network, wherein performing the dynamic band-switching operation includes switching from the first WiFi frequency band to a second WiFi frequency band; and transmitting the communication using the second WiFi frequency band, wherein the communication is transmitted to a second node of the mesh network, wherein a second dynamic band-switching operation is always performed by the second node when it is determined that the communication is to be transmitted from the second node to a destination device that is not a node of the mesh network, wherein the determination that the destination device is not a node of the mesh network is based on the destination address, and wherein the second dynamic band-switching operation includes switching from the second WiFi frequency band to the first WiFi frequency band.

10. The method of claim 9, further comprising transmitting a communication received from a third device to a fourth device on the first WiFi frequency band when it is determined that the third device and the fourth device are nodes of the mesh network, wherein the communication is transmitted to the fourth device using a first WiFi circuit.

11. The method of claim 10, wherein the third device or the fourth device includes a wireless range extending device.

12. The method of claim 9, wherein the communication is transmitted to the second node of the mesh network on a channel of the second WiFi frequency band.

13. The method of claim 9, wherein the origin device or the destination device includes a network device, an access device, or a server of a wide area network.

14. The method of claim 12, wherein when the first WiFi frequency band includes a 2.4 gigahertz frequency band, the second WiFi frequency band includes a 5 gigahertz frequency band.

15. The method of claim 12, wherein when the first WiFi frequency band includes a 5 gigahertz frequency band, the second WiFi frequency band includes a 2.4 gigahertz frequency band.

16. The method of claim 9, wherein the computing device includes a wireless range extending device.

17. A computer-program product tangibly embodied in a non-transitory machine-readable storage medium of a computing device, including instructions configured to cause one or more data processors to:

receive a communication at the computing device, wherein the computing device is a node of a mesh network, wherein the communication includes a source address of an origin device of the communication and a destination address of a destination device for the communication, and wherein the communication is received on a first WiFi frequency band;

determine whether the origin device is a node of the mesh network based on the source address;

determining whether to perform a dynamic band-switching operation, wherein a band-switching operation is always performed when the origin device is not a node of the mesh network;

performing a dynamic band-switching operation when the origin device is not a node of the mesh network, wherein performing the dynamic band-switching operation includes switching from the first WiFi frequency band to a second WiFi frequency band; and transmit the communication on the second WiFi frequency band, wherein the communication is transmitted to a second node of the mesh network, wherein a second dynamic band-switching operation is always performed by the second node when it is determined that the communication is to be transmitted from the second node to a destination device that is not a node of the mesh network, wherein the determination that the destination device is not a node of the mesh network is based on the destination address, and wherein the second dynamic band-switching operation includes switching from the second WiFi frequency band to the first WiFi frequency band.

18. The computer-program product of claim 17, further comprising instructions configured to cause the one or more data processors to transmit a communication received from a third device to a fourth device on the first WiFi frequency band when it is determined that the third device and the fourth device are nodes of the mesh network, wherein the communication is transmitted to the fourth device using a first WiFi circuit.

* * * * *